(12) United States Patent
Taki et al.

(10) Patent No.: US 9,959,646 B2
(45) Date of Patent: May 1, 2018

(54) INFORMATION DISPLAY DEVICE, DISTRIBUTION DEVICE, INFORMATION DISPLAY METHOD, AND NON-TRANSITORY COMPUTER READABLE STORAGE MEDIUM

(71) Applicant: YAHOO JAPAN CORPORATION, Tokyo (JP)

(72) Inventors: Chiemi Taki, Tokyo (JP); Daisuke Kobayashi, Tokyo (JP); Keisuke Kimura, Tokyo (JP); Tatsuaki Suzuki, Tokyo (JP); Kensuke Takada, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days. days.

(21) Appl. No.: 14/795,475

(22) Filed: Jul. 9, 2015

(65) Prior Publication Data

US 2016/0012624 A1 Jan. 14, 2016

(30) Foreign Application Priority Data

Jul. 11, 2014 (JP) .................................. 2014-143674

(51) Int. Cl.
| | |
|---|---|
| *G09G 5/00* | (2006.01) |
| *G06T 11/60* | (2006.01) |
| *G06F 3/01* | (2006.01) |
| *G06Q 30/02* | (2012.01) |

(52) U.S. Cl.
CPC .............. *G06T 11/60* (2013.01); *G06F 3/017* (2013.01); *G06Q 30/0241* (2013.01); *G06F 2200/1637* (2013.01)

(58) Field of Classification Search
None
See application file for complete search history.

(56) References Cited

U.S. PATENT DOCUMENTS

| | | | |
|---|---|---|---|
| 2012/0147037 A1* | 6/2012 | Takami ............. | G06F 17/30991 345/629 |
| 2015/0199835 A1* | 7/2015 | Golding ................. | G06T 11/60 715/202 |

FOREIGN PATENT DOCUMENTS

| | | |
|---|---|---|
| JP | 2003-022042 A | 1/2003 |
| JP | 2008519382 A | 6/2008 |
| JP | 2010-526494 A | 7/2010 |
| JP | 2011082650 A | 4/2011 |
| JP | 2012212194 A | 11/2012 |

(Continued)

OTHER PUBLICATIONS

Stefan, Office 2013 Guide to PowerPoint Transitions and Animations, Aug. 2013, GroovyPost.com.*

(Continued)

*Primary Examiner* — Xiao Wu
*Assistant Examiner* — Mohammad H Akhavannik
(74) *Attorney, Agent, or Firm* — Oliff PLC

(57) ABSTRACT

According to one aspect of an embodiment, an information display device includes a display unit that displays first content in a display region. The information display device includes a detection unit configured to detect a physical state of a terminal device. The information display device includes a display control unit configured to direct the display unit to display second new content in the display region while changing a display mode of the first content, on the basis of the detection result of the detection unit.

20 Claims, 9 Drawing Sheets

(56) References Cited

FOREIGN PATENT DOCUMENTS

| | | |
|---|---|---|
| JP | 2013-055376 A | 3/2013 |
| JP | 2013134494 A | 7/2013 |
| JP | 2014-032554 A | 2/2014 |
| WO | 2006050284 A1 | 5/2006 |
| WO | 2008/137482 A1 | 11/2008 |
| WO | 2012120863 A1 | 9/2012 |

OTHER PUBLICATIONS fpptfppt, "How to Use the Random Bars Transition Effect in PowerPoint 2013", Jul. 24, 2013, https://www.youtube.com/watch?v=2d8iMs2VFz8.*

Kimura, R., "Keynote Presentation Practice Guide for iPad & iPhone," Feb. 29, 2012, pp. 108-114, 1st edition.

Suck, A.e., "Flash Motion Typography 50 Sample & Tutorial," Feb. 29, 2012, pp. 131-135, 1st edition.

Aug. 25, 2015 Office Action issued in Japanese Patent Application No. 2014-143674.

Dec. 8, 2015 Office Action issued in Japanese Patent Application No. 2014-143674.

Oct. 21, 2014 Office Action issued in Japanese Application No. 2014-143674.

Mar. 10, 2015 Office Action issued in Japanese Application No. 2014-143674.

Mar. 6, 2018 Office Action issued in Japanese Patent Application No. 2016-044911.

* cited by examiner

| ADVERTISER ID | ADVERTISING CONTENT | BIDDING PRICE | CTR |
|---|---|---|---|
| B10 | C11 (C11a TO C11b, DISPLAY INSTRUCTION) | 100 | 0.02 |
| | C12 | 50 | 0.01 |
| | C13 | 150 | 0.02 |
| | ... | ... | ... |
| B20 | C21 | 100 | 0.01 |
| | C22 | 50 | 0.02 |
| | ... | ... | ... |
| ... | ... | ... | ... | ise,
INFORMATION DISPLAY DEVICE, DISTRIBUTION DEVICE, INFORMATION DISPLAY METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-143674 filed in Japan on Jul. 11, 2014.

BACKGROUND OF THE INVENTION

1. Field of the Invention

The present invention relates to an information display device, a distribution device, an information display method, and a non-transitory computer readable storage medium having an information displaying program stored therein.

2. Description of the Related Art

In recent years, information has been actively distributed through the Internet. For example, a technique has been known which arranges and displays advertising content, such as a still image, a moving image, or text related to, for example, companies or products, at a predetermined position of a web page. In addition, as a technique related to information distribution, a technique has been proposed which displays content, such as a moving image or a web page, on a first layer and displays advertising content on a second layer that is displayed so as to overlap the first layer.

However, in the above-mentioned techniques according to the related art, in some cases, it is difficult to improve the advertising effect of advertising content. For example, in the related art, when advertising content is displayed on a smart device, such as a smart phone, it is difficult to make the user interested in advertising content since a display screen is small.

SUMMARY OF THE INVENTION

It is an object of the present invention to at least partially solve the problems in the conventional technology.

According to one aspect of an embodiment, an information display device includes a display unit that displays first content in a display region. The information display device includes a detection unit configured to detect a physical state of a terminal device. The information display device includes a display control unit configured to direct the display unit to display second new content in the display region while changing a display mode of the first content, on the basis of the detection result of the detection unit.

According to the other aspect of an embodiment, a distribution device includes a distribution unit configured to distribute control information, first content, and second content to a terminal device. The control information causes the terminal device to perform a display process of displaying the first content in a display region of the terminal device, a detection process of detecting a physical state of the terminal device, a display control process of displaying the second content in the display region while changing a display mode of the first content, on the basis of the detection result obtained by the detection process.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
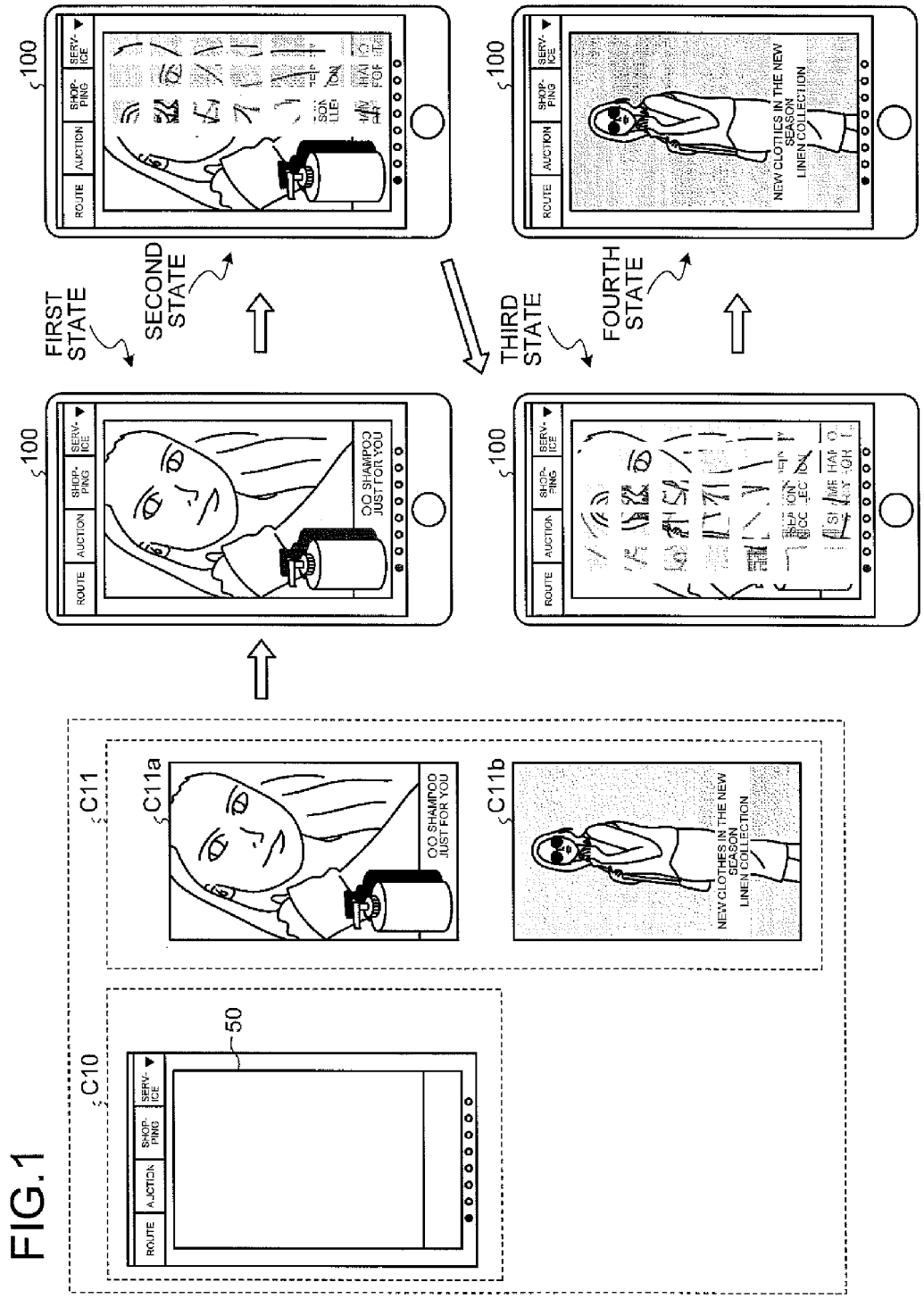
FIG. 1 is a diagram illustrating an example of a terminal device according to an embodiment.

Hereinafter, modes (hereinafter, referred to as "embodiments") for carrying out an information display device, a distribution device, an information display method, and a non-transitory computer readable storage medium having an information display program stored therein according to the invention will be described in detail with reference to the drawings. The information display device, the distribution device, the information display method, and the non-transitory computer readable storage medium having the information display program stored therein according to the invention are not limited by the embodiments. In the following embodiments, the same components are denoted by the same reference numerals and the description thereof will not be repeated.

1. Display Process

First, an example of the process of a terminal device 100, which is an example of the information display device, will be described with reference to FIG. 1. FIG. 1 is a diagram illustrating an example of the terminal device according to an embodiment. FIG. 1 illustrates an example in which the terminal device 100 displays a web page C10 and a plurality of advertising content items C11a and C11b. In the following description, in some cases, the plurality of advertising content items C11a and C11b are referred to as an advertising content item C11.

The terminal device 100 illustrated in FIG. 1 is a smart device, such as a smart phone or a tablet, and is a mobile terminal device that can communicate with an arbitrary server device through a wireless communication network, such as a third-generation (3G) network or a long term evolution (LTE) network. The terminal device 100 includes an output unit 130 such as a liquid crystal display. It is assumed that a touch panel is used as the terminal device 100. That is, the user of the terminal device 100 touches a display surface of the output unit 130 with a finger or a dedicated pen to perform various operations.

The terminal device 100 includes a physical sensor 140 that can measure the state of the terminal device 100. For example, the terminal device 100 includes, as the physical sensor 140, a gyro sensor that can measure the inclination direction of each axis of the terminal device 100. The terminal device 100 can measure the direction of each axis of the terminal device 100, using the gyro sensor, to detect the inclination of the terminal device 100. In the following description of the process of the terminal device 100, the left-right direction of the screen of the terminal device 100 is referred to as the X-axis, the up-down direction thereof is referred to as the Y-axis, and the front-rear direction thereof is referred to as the Z-axis.

The web page C10 is, for example, content in which news, a weather forecast, the index or content of received mail, a photo viewer, and various other kinds of content are independently arranged in a tile shape. For example, it is possible to operate or update each of the content items arranged in the tile shape. The size or position of each of the tiles arranged in the web page C10 may be automatically changed for each tile or it may be changed by the operation of the user. The web page C10 may be described by a hyper text markup language (HTML) or an extensible markup language (XML). The web page C10 includes, for example, an input field for inputting a search keyword and links to other web pages.

For example, each news topic is displayed as items of the "latest news" or a "news list" in the web page C10. The news topic corresponds to an anchor text having links to other web pages.

In addition, buttons, such as a "route" button, an "auction" button, and a "shopping" button, in which links to web pages for providing various services are set are arranged in the web page C10. A button "service" is also arranged in the web page C10. When the button is selected, links to web pages for providing various other services are displayed in a pull-down manner.

In addition, an advertisement frame 50 which is a display region of advertising content is arranged as an independent tile in the web page C10, similarly to other content items. When receiving the distributed web page C10, the terminal device 100 transmits a request to transmit advertising content to an advertisement distribution server 20 which distributes advertising content. Then, when receiving advertising content distributed from the advertisement distribution server 20, the terminal device 100 displays the web page C10 and displays the distributed advertising content in a range in which the advertisement frame 50 is arranged in the displayed web page C10.

The advertising content item C11 is, for example, a still image or a moving image which is a portion of an advertisement and is provided by an advertiser. In the example illustrated in FIG. 1, the advertising content item C11 includes a plurality of advertising content items C11a and C11b. Each of the advertising content items C11a and C11b is an image which has the same size as the advertisement frame 50 and in which, for example, the image of a shampoo or clothes to be advertised, an illustration, and the name of a product to be advertised are arranged. The advertising content items C11a and C11b are displayed such that the advertising content item C11a is arranged at the very front and the advertising content item C11a and the advertising content item C11b are sequentially superimposed.

Specifically, the advertising content item C11a is an image in which a shampoo, which is an advertising product, and a woman are drawn and an advertising copy "○○ shampoo just for you" is arranged. The advertising content item C11b is an image in which a woman wearing clothes, which are advertising products, is drawn and an advertising copy "New clothes in the new season" or "Linen collection" is arranged.

Here, links to different web pages (so-called landing pages) are set in the advertising content item C11a and the advertising content item C11b. For example, when the user performs, for example, a tap operation to select the advertising content item C11a displayed on the screen, the terminal device 100 displays a first landing page corresponding to the advertising content item C11a. When the user performs, for example, a tap operation to select the advertising content item C11b, the terminal device 100 displays a second landing page corresponding to the advertising content item C11b. The same landing page may be set in the advertising content item C11a and the advertising content item C11b. When the advertising content items C11a and C11b are selected, the terminal device 100 may display, for example, a predetermined moving image, in addition to the web page such as the landing page.

2. Process Performed by Terminal Device 100

Here, the terminal device 100 performs the following process in order to make the user interested in an advertisement. First, the terminal device 100 arranges the advertising content item C11a as first content in the advertisement frame 50 of the web page C10 and displays the web page C10 on the entire screen. In addition, the terminal device 100 detects the physical state of the terminal device 100. Then, the terminal device 100 newly displays the advertising content item C11b as second content while changing the display mode of the advertising content item C11a, on the basis of the detected state. That is, the terminal device 100 performs a rendering process which changes the display mode of the advertising content item C11a, depending on the detected state, and newly displays a new advertising content item C11b in the advertisement frame 50.

2-1. Rendering Process

For example, the terminal device 100 detects the inclination of the terminal device 100. Then, the terminal device 100 performs a rendering process which changes the display mode of the advertising content item C11a displayed in the advertisement frame 50, depending on the detected inclination, and displays the advertising content item C11b. For example, when the inclination of the terminal device 100 is equal to or greater than a predetermined threshold value, the terminal device 100 divides the advertising content item C11a into a plurality of regions and changes the display mode of the advertising content item C11a such that aspects of change in the transmittance of each region are different from each other.

Specifically, the terminal device 100 arranges the advertising content item C11b on the back side of the advertising content item C11a. In addition, the terminal device 100 divides the advertising content item C11a into a plurality of small regions (for example, seven small regions in the vertical direction and six small regions in the horizontal direction) and the small regions arranged in the vertical direction form a group. Then, when the user inclines the terminal device 100 to the right side with respect to the Y-axis, the terminal device 100 changes the transmittance of the small regions included in each groups in the order from a group which is located on the right side of the screen to a group which is located on the left side of the screen at different times to change the display mode of the advertising content item C11a.

Next, an example of a rendering process of changing the display mode of the small region will be described. For example, the terminal device 100 arranges a white line which has a predetermined transmittance and a predetermined thickness (for example, a white line having a thickness that is half the length of the small region in the vertical direction or the horizontal direction) around each small region. Then, the terminal device 100 further increases the transmittance of a region included in the small region and the transmittance of the white line arranged around the small region and reduces the thickness of the white line. Then, the terminal device 100 gradually increases the transmittance of the region included in the small region and the transmittance of the white line to 100% and gradually reduces the thickness of the white line to 0.

The terminal device 100 starts the rendering process in stages from the group which is located on the right side of the screen to the group which is located on the left side of the screen. As a result, the terminal device 100 switches the advertising content item C11 to be displayed in such a way that white light is emitted from each small region from the right side to the left side of the screen and the advertising content item C11a is gradually switched to the advertising content item C11b. Therefore, the terminal device 100 can make the user interested in an advertisement.

2-2. Example of Display by Rendering Process

Next, an example of the screen displayed when the terminal device 100 performs the rendering process will be described with reference to FIG. 1. In the following description, an example in which a change in the display mode of the advertising content item C11 by the terminal device 100 in response to the operation of the user is divided into first to fourth states will be described.

First, the terminal device 100 receives the web page C10 and the advertising content items C11a and C11b. In this case, as illustrated in the first state, the terminal device 100 displays the advertising content item C11a in the advertisement frame 50 and arranges the advertising content item C11b on the back side of the advertising content item C11a. As a result, the terminal device 100 displays only the advertising content item C11a in the advertisement frame 50, as illustrated in the first state.

Then, the terminal device 100 detects the inclination of the terminal device 100. When the user inclines the terminal device 100 to the left side with respect to the Y-axis, that is, when the user inclines the terminal device 100 at a predetermined angle or more in the counterclockwise direction in the X-Z plane, the terminal device 100 starts the rendering process as illustrated in the second state. Specifically, the terminal device 100 arranges a white line having a predetermined transmittance and a predetermined thickness around a small region in a group (hereinafter, referred to as a first group) that is located on the right side of the screen in the advertising content item C11a so as to surround the small region. Then, the terminal device 100 further increases the transmittance of a region included in the small region and the transmittance of the white line arranged around the small region and reduces the thickness of the white line.

The terminal device 100 starts the rendering process for a small region in a group (hereinafter, referred to as a second group) which is arranged on the left side of the first group after a predetermined period of time has elapsed from the start of the rendering process for the small region in the first group. Then, the terminal device 100 starts the rendering process for a small region in a group (hereinafter, referred to as a third group) which is arranged on the left side of the second group after a predetermined period of time has elapsed from the start of the rendering process for the small region in the second group. As a result, the terminal device 100 displays a screen such that white light is emitted from each small region and the advertising content item C11a is gradually switched to the advertising content item C11b from the right side, as illustrated in the second state in FIG. 1.

The terminal device 100 sequentially starts the rendering process from the first group to the leftmost group. As a result, as illustrated in the third state in FIG. 1, the terminal device 100 gradually switches the advertising content item C11a to the advertising content item C11b. Then, the terminal device 100 performs the rendering process for all of the groups to increase the transmittance of the entire advertising content item C11a to 100%. As a result, the terminal device 100 displays the advertising content item C11b in the advertisement frame 50, as illustrated in the fourth state in FIG. 1.

As such, when the inclination of the terminal device 100 is detected, the terminal device 100 performs the rendering process of changing the display mode of the advertising content item C11a and newly displays the advertising content item C11b. Therefore, the terminal device 100 can make the user interested in an advertisement.

2-3. Variation in Rendering Process

When the terminal device 100 is inclined after the advertising content item C11 displayed on the screen switches from the advertising content item C11a to the advertising content item C11b, the terminal device 100 may perform the above-mentioned rendering process for the advertising content item C11b to change the display mode of the advertising content item C11b and to newly display the advertising content item C11a.

For example, the terminal device 100 arranges the advertising content item C11a on the back side of the advertising content item C11b and divides the advertising content item C11b into small regions. Then, the terminal device 100 performs the rendering process in stages from a group of small regions which is located on the right side of the screen to a group which is located on the left side of the screen. As a result, the advertising content item. C11 to be displayed is switched in such a way that white light is emitted from each small region of the advertising content item C11b and the advertising content item C11b is gradually switched to the advertising content item C11a.

The above-mentioned process may be implemented by reducing the transmittance of the advertising content item C11a. For example, the terminal device 100 displays the advertising content item C11a on the screen and arranges the advertising content item C11b on the back side of the advertising content item C11a. When the inclination angle of the terminal device 100 is equal to or greater than a predetermined value, the terminal device 100 performs the above-mentioned rendering process to display the advertising content item C11b while changing the display mode of the advertising content item C11a. When the above-mentioned process is performed, the terminal device 100 finally increases the transmittance of the advertising content item C11a to 100% to display the advertising content item C11b.

When the terminal device 100 is inclined to the left side, the transmittance is 100% and the terminal device 100 divides the displayed advertising content item C11a into small regions and performs the following process from the rightmost group to the leftmost group on the screen. First, the terminal device 100 arranges a white line having a predetermined transmittance and a predetermined thickness around the small region. Then, the terminal device 100 reduces the transmittance of a region included in the small region, further increases the transmittance of the white line arranged around the small region, and reduces the thickness of the white line.

Then, the terminal device 100 gradually reduces the transmittance of the region included in the small region to 0%, gradually increases the transmittance of the white line to 100%, and gradually reduces the thickness of the white line to 0. That is, the terminal device 100 makes each small region emit light and gradually displays the advertising content item C11a included in each small region. As a result, the terminal device 100 switches the advertising content item C11 to be displayed in such a way that white light is emitted from each small region and the advertising content item C11b is gradually switched to the advertising content item C11a.

2-4. For Inclination Direction

When the user inclines the terminal device 100 to the right side with respect to the Y-axis, that is, when the user inclines the terminal device 100 at a predetermined angle or more in the clockwise direction in the X-Z plane, the terminal device 100 performs the rendering process for each small region of the advertising content item C11a from the leftmost group to the rightmost group on the screen. As a result, the terminal device 100 switches the advertising content item C11 to be displayed in such a way that white light is emitted from for each small region of the advertising content item C11a from the right side to the left side on the screen and the advertising content item C11a is gradually switched to the advertising content item C11b.

When the user inclines the upper side of the terminal device 100 to the back side with respect to the X-axis, that is, when the user inclines the terminal device 100 at a predetermined angle of more in the clockwise direction in the Y-Z plane, the terminal device 100 may perform the rendering process for each small region of the advertising content item C11a from the lowermost group to the uppermost group on the screen. In addition, when the user inclines the upper side of the terminal device 100 to the front side with respect to the X-axis, that is, when the user inclines the terminal device 100 at a predetermined angle of more in the clockwise direction in the Y-Z plane, the terminal device 100 may perform the rendering process for each small region of the advertising content item C11a from the uppermost group to the lowermost group on the screen. That is, the terminal device 100 may change the display mode of the advertising content item C11, depending on the inclination direction of the terminal device 100.

2-5. For Landing Page and Others

When the user selects the advertising content items C11a and C11b during the rendering process, the terminal device 100 displays content, such as a landing page or a moving image corresponding to the selected advertising content item C11. For example, when the user taps the screen during the rendering process, the terminal device 100 determines whether advertising content which is displayed at the tapped position is the advertising content item C11a or the advertising content item C11b.

For example, when the transmittance of the advertising content item C11a displayed at the tapped position is equal to or less than 50%, the terminal device 100 determines that the advertising content displayed at the tapped position is the advertising content item C11a. On the other hand, when the transmittance of the advertising content item C11a displayed at the tapped position is greater than 50%, the terminal device 100 determines that the advertising content displayed at the tapped position is the advertising content item C11b. Then, the terminal device 100 displays content corresponding to the determined advertising content item C11.

2-6. For Execution Subject

The terminal device 100 can achieve the above-mentioned process using an arbitrary method, which has not been described above. For example, the terminal device 100 may download in advance an application which causes the terminal device 100 to perform the display of the web page C10 and the above-mentioned rendering process and execute the application at any time to achieve the above-mentioned process. In addition, the terminal device 100 may receive distributed control information for performing the rendering process at the same time as the web page C10 or the advertising content item C11 is distributed. Then, the terminal device 100 performs the rendering process on the basis of the control information. Next, for example, the terminal device 100 which performs the rendering process on the basis of the control information will be described.

3. Structure of Advertisement Distribution System

Figure 2:
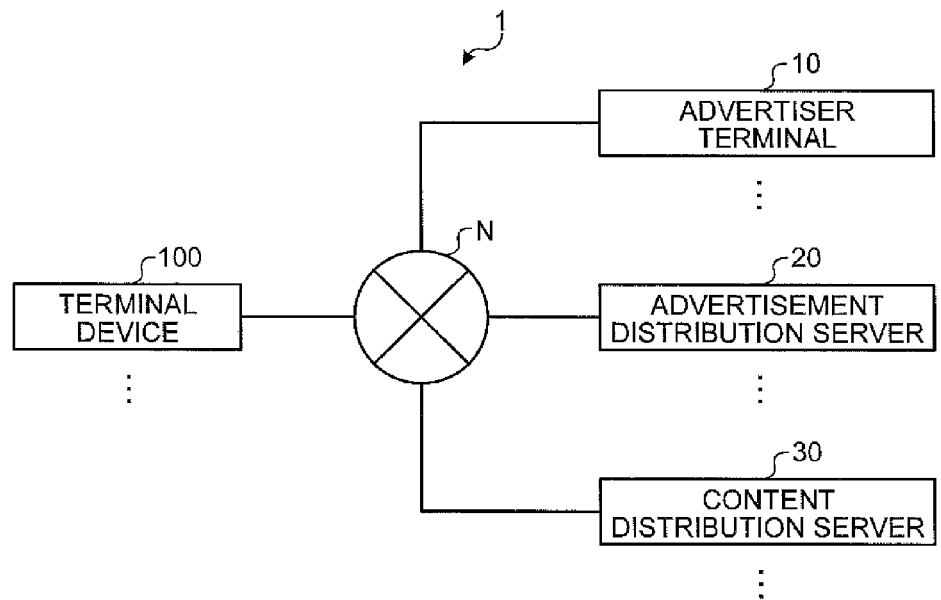
FIG. 2 is a diagram illustrating an example of the structure of an advertisement distribution system according to the embodiment.

Next, for example, the terminal device 100 which achieves the above-mentioned display process will be described. First, the structure of an advertisement distribution system 1 according to the embodiment will be described with reference to FIG. 2. FIG. 2 is a diagram illustrating an example of the structure of the advertisement distribution system according to the embodiment. As illustrated in FIG. 2, the advertisement distribution system 1 includes the terminal device 100, an advertiser terminal 10, the advertisement distribution server 20, and a content distribution server 30. The terminal device 100, the advertiser terminal 10, the advertisement distribution server 20, and the content distribution server 30 are connected through a network N such that they can communicate with each other wirelessly or in a wired manner. The advertisement distribution system 1 illustrated in FIG. 2 may include a plurality of terminal devices 100, a plurality of advertiser terminals 10, a plurality of advertisement distribution servers 20, or a plurality of content distribution servers 30.

The terminal device 100 is an information processing device used by the user who browses a web page. For example, the terminal device 100 is a mobile phone, such as a smart phone, a tablet terminal, a personal digital assistant (PDA), a desktop personal computer (PC), or a notebook PC. The terminal device 100 acquires the web page C10 from the content distribution server 30 and displays the acquired web page C10, in response to the operation of the user. When the web page C10 includes an advertisement acquisition command which will be described below, the terminal device 100 acquires the advertising content item C11 from the advertisement distribution server 20 and displays the acquired advertising content item C11 together with the web page C10.

The advertiser terminal 10 is an information processing device which is used by an advertiser. For example, the advertiser terminal 10 is a desktop PC, a notebook PC, a tablet terminal, a mobile phone, or a PDA. The advertiser terminal 10 submits the advertising content item C11 to the advertisement distribution server 20 in response to the operation of the advertiser. For example, the advertiser terminal 10 submits, as the advertising content item C11, a still image, a moving image, text data, and a uniform resource locator (URL) for acquiring content corresponding to the advertising content item C11 to the advertisement distribution server 20.

In some cases, the advertiser requests an agency to submit advertising content. In this case, the agency transmits advertising content to the advertisement distribution server 20. Hereinafter, the concept of the term "advertiser" includes not only the advertiser but also the agency. The concept of the term "advertiser terminal" includes not only the advertiser terminal 10 but also an agency device used by the agency.

The advertisement distribution server 20 is a server device which distributes the advertising content submitted from the advertiser terminal 10. For example, when the advertisement distribution server 20 is accessed by the terminal device 100, the advertisement distribution server 20 performs advertisement matching on the basis of the position of the terminal device 100 or the attributes of the user and distributes, to the terminal device 100, advertising content which is determined be distributed on the basis of the matching result. In addition, the advertisement distribution server 20 distributes, to the terminal device 100, control information indicating the display mode of the advertising content to be distributed together with the advertising content. The control information is described by, for example, a script language, such as JavaScript (registered trademark) or Cascading Style Sheets (CSS).

The content distribution server 30 is, for example, a web server which distributes web pages to the terminal device 100. For example, the content distribution server 30 distributes, to the terminal device 100, the web page C10 including tiles including various kinds of information related to a portal site, a news site, an auction site, a weather forecast site, a shopping site, a finance (stock) site, a route search site, a map provision site, a tourism site, a restaurant introduction site, and a web blog. The content distribution server 30 may be a server which individually transmits the web pages of various sites to the terminal device 100.

Here, the web page C10 distributed by the content distribution server 30 is formed by, for example, a hyper text markup language (HTML) file described by an HTML or an extensible markup language (XML) file described by an XML. The web page C10 distributed by the content distribution server 30 includes an advertisement acquisition command. For example, the URL of the advertisement distribution server 20 is described as the advertisement acquisition command in the HTML file forming the web page C10. In this case, the terminal device 100 accesses the URL described in, for example, the HTML file to acquire advertising content from the advertisement distribution server 20.

For example, various kinds of data which are distributed from the content distribution server 30 to the terminal device 100 are actually an HTML file or an image forming a web page and a moving image which is superimposed on the web page and is then displayed. Hereinafter, in some cases, various kinds of data which are distributed from the content distribution server 30 to the terminal device 100 are referred to as content.

4. Structure of Advertisement Distribution Server

Figure 3:
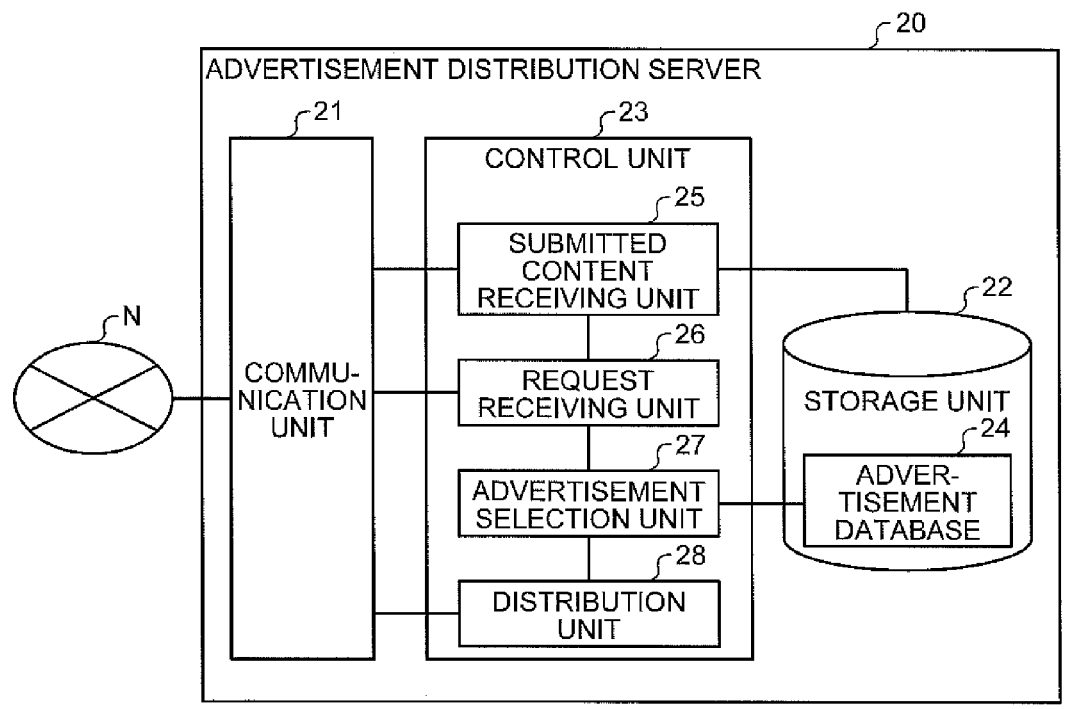
FIG. 3 is a diagram illustrating an example of the structure of an advertisement distribution server according to the embodiment.

Next, the structure of the advertisement distribution server 20 according to the embodiment will be described with reference to FIG. 3. FIG. 3 is a diagram illustrating an example of the structure of the advertisement distribution server according to the embodiment. As illustrated in FIG. 3, the advertisement distribution server 20 includes a communication unit 21, a storage unit 22, and a control unit 23.

The communication unit 21 is, for example, a network interface card (NIC). The communication unit 21 is connected to the network N wirelessly or in a wired manner and transmits and receives information to and from the terminal device 100, the advertiser terminal 10, and the content distribution server 30.

The storage unit 22 is, for example, a semiconductor memory device, such as random access memory (RAM) or flash memory, or a storage device, such as a hard disk or an optical disk. The storage unit 22 stores an advertisement database 24 in which various kinds of information related to advertising content which is submitted from the advertiser terminal 10 are stored.

Figures 4, 5:
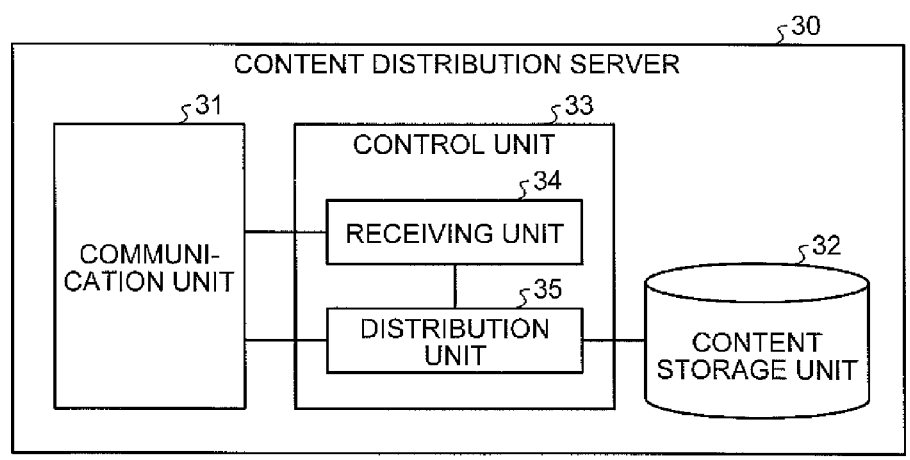
FIG. 4 is a diagram illustrating an example of information stored in an advertisement database according to the embodiment.
FIG. 5 is a diagram illustrating an example of the structure of a content distribution server according to the embodiment.

FIG. 4 is a diagram illustrating an example of the information stored in the advertisement database according to the embodiment. In the example illustrated in FIG. 4, the advertisement database 24 has items, such as an "advertiser ID", "advertising content", a "bidding price", and a "click through rate (CTR)".

The "advertiser ID" is identification information for identifying the advertiser or the advertiser terminal 10. The "advertising content" indicates advertising content which is submitted from the advertiser terminal 10. FIG. 4 illustrates an example in which conceptual information, such as "C11" or "C12", is stored as the "advertising content". However, in practice, for example, a still image, a moving image, text data, a URL, or a file path name indicating the storage position thereof is stored.

The "bidding price" indicates an advertisement rate which is designated by the advertiser when advertising content is submitted. For example, the "bidding price" corresponds to a unit price which is paid to the advertisement distributor (for example, the administrator of the advertisement distribution server 20 or the content distribution server 30) by the advertiser when advertising content is displayed in a web page once. For example, the "bidding price" may be the amount of money corresponding to a unit price which is paid to the advertisement distributor by the advertiser when the user clicks advertising content once.

The "CTR" indicates a value obtained by dividing the number of times advertising content is clicked by the number of times advertising content is displayed. The CTR of advertising content which has not been distributed to the terminal device 100 stores, for example, a predetermined fixed value, the average value of the CTRs of all advertising content items, and the average value of the CTRs of all of the advertising content items belonging to the same advertisement category (for example, a car or travel). In addition, the "CTR" may store a predicted CTR which is predicted by, for example, a CTR prediction model. The predicted CTR is predicted by, for example, the type of advertising content or the type of web page in which advertising content is displayed.

That is, FIG. 4 illustrates an example in which an advertiser who is identified by an advertiser ID "B10" designates a bidding price "100" and submits advertising content "C11". In addition, FIG. 4 illustrates an example in which the CTR of the advertising content "C11" is "0.02".

Here, advertising content which is displayed in the advertisement frame 50 and a display instruction indicating how to display each advertising content are registered as the advertising content in the advertisement database 24. For example, in the example illustrated in FIG. 4, the advertising content items C11a and C11b illustrated in FIG. 1 are registered as the advertising content item C11 in the advertisement database 24. In addition, it is assumed that the advertisement database 24 stores, as the advertising content item C11, a display instruction to perform the above-mentioned rendering process to change the display mode of the advertising content item C11a and to display the advertising content item C11b when the inclination of the terminal device 100 is detected.

The description is continued with reference to FIG. 3. For example, a central processing unit (CPU) or a micro processing unit (MPU) executes various programs stored in a storage device of the advertisement distribution server 20, using RAM as a work area, to implement the functions of the control unit 23. In addition, the control unit 23 is implemented by an integrated circuit, such as an application specific integrated circuit (ASIC) or a field programmable gate array (FPGA).

As illustrated in FIG. 3, the control unit 23 includes a submitted content receiving unit 25, a request receiving unit 26, an advertisement selection unit 27, and a distribution unit 28 and implements or performs the following information processing function or operation. The internal structure of the control unit 23 is not limited to that illustrated in FIG. 3 and the control unit 23 may have any other structures as long as it can perform the following information processing. In addition, the connection relationship between the processing units provided in the control unit 23 is not limited to that illustrated in FIG. 3 and the processing units may have other connection relationship therebetween.

The submitted content receiving unit 25 receives the advertising content submitted from the advertiser terminal 10. Specifically, the submitted content receiving unit 25 receives the designated bidding price and the submitted advertising content. In addition, the submitted content receiving unit 25 receives the advertising content items C11a and C11b and the display instruction to perform the above-mentioned rendering process to change the display mode of the advertising content item C11a and to display the advertising content item C11b when the inclination of the terminal device 100 is detected. In this case, the submitted content receiving unit 25 registers the advertising content items C11a and C11b and the display instruction in the advertisement database 24 together with the advertiser ID and the received bidding price.

The submitted content receiving unit 25 receives, from the advertiser terminal 10, a URL indicating, for example, the location of the landing page set in each of the advertising content items C11a and C11b when the advertising content is submitted. Then, the submitted content receiving unit 25 registers the received URL indicating, for example, the location of the landing page in the advertisement database 24 together with the advertising content items C11a and C11b.

The request receiving unit 26 receives an advertising content acquisition request from the terminal device 100. For example, the request receiving unit 26 receives an HTTP request as the advertising content acquisition request.

When the request receiving unit 26 receives the advertising content acquisition request, the advertisement selection unit 27 selects the advertising content to be distributed from the advertisement database 24. For example, the advertisement selection unit 27 performs the matching of the advertising content to be distributed from the advertising content items registered in the advertisement database 24, on the basis of the position of the terminal device 100 or the attributes of the user. In the matching process, advertising content having a high bidding price or a high CTR or advertising content having both a high bidding price and a high CTR may be preferentially selected. Then, the advertisement selection unit 27 outputs the advertising content which has been selected as a distribution target to the distribution unit 28.

When the web page is a search page, the advertisement selection unit 27 may use an advertisement distribution method which is called search advertising for extracting advertising content matched with a search keyword that is designated in the search page. In addition, the advertisement selection unit 27 may use an advertisement distribution method which is called targeting distribution for extracting advertising content matched with the attribute information (for example, psychographic attributes and demographic attributes) of the user.

The distribution unit 28 distributes the advertising content selected by the advertisement selection unit 27 and the control information to the terminal device 100. Specifically, when receiving the advertising content selected by the advertisement selection unit 27, the distribution unit 28 extracts the display instruction included in the received advertising content. Then, the distribution unit 28 generates control information for displaying the advertising content in the display mode indicated by the extracted display instruction.

For example, the distribution unit 28 generates control information for causing the terminal device 100 to perform a display process of displaying the advertising content item C11a first, a detection process of detecting the physical state of the terminal device 100, and a display control process of newly displaying the advertising content item C11b while changing the display mode of the advertising content item C11a. Specifically, the distribution unit 28 generates control information for performing a display process of displaying the advertising content item C11a in the advertisement frame 50 of the web page C10. In addition, the distribution unit 28 generates control information for performing a detection process of detecting the inclination of the terminal device 100. The distribution unit 28 also generates control information for performing a display control process of performing the above-mentioned rendering process to change the display mode of the advertising content item C11a and to newly display the advertising content item C11b when the inclination of the terminal device 100 is detected.

When the URLs of, for example, the landing pages set in the advertising content items C11a and C11b are registered in the advertisement database 24, the distribution unit 28 generates control information for causing the terminal device 100 to perform the following process. For example, when links to URLs corresponding to the advertising content items C11a and C11b are set and the user selects the advertising content items C11a and C11b, the distribution unit 28 generates control information for causing the terminal device 100 to perform a process of displaying, for example, the landing pages indicated by the corresponding URLs. Then, the distribution unit 28 distributes the generated control information and the data of an image or a moving image included in the advertising content to the terminal device 100.

5. Structure of Content Distribution Server 30

Next, the structure of the content distribution server 30 according to the embodiment will be described with reference to FIG. 5. FIG. 5 is a diagram illustrating an example of the structure of the content distribution server according to the embodiment. As illustrated in FIG. 5, the content distribution server 30 includes a communication unit 31, a content storage unit 32, and a control unit 33.

The communication unit 31 is, for example, an NIC. The communication unit 31 is connected to the network N wirelessly or in a wired manner and transmits and receives information to and from the terminal device 100 or the advertisement distribution server 20.

The content storage unit 32 is, for example, a semiconductor memory device, such as RAM or flash memory, or a storage device, such as a hard disk or an optical disk. The content storage unit 32 stores a web page which is an example of content. For example, the content storage unit 32 stores an HTML file forming a web page or a still image or a moving image displayed in a web page. The web page stored in the content storage unit 32 includes, for example, a process of causing the terminal device 100 to acquire information displayed in each tile from an arbitrary server and to display the acquired information in the corresponding tile or an advertisement acquisition command to acquire the advertising content displayed in the advertisement frame 50.

For example, a CPU or an MPU executes various programs (corresponding to an example of a distribution program) stored in a storage device of the content distribution server 30, using RAM as a work area, to implement the function of the control unit 33. In addition, the control unit 33 is implemented by an integrated circuit, such as an ASIC or an FPGA.

As illustrated in FIG. 5, the control unit 33 includes a receiving unit 34 and a distribution unit 35 and implements or performs the following information processing function or operation. The internal structure of the control unit 33 is not limited to that illustrated in FIG. 5 and the control unit 33 may have any other structures as long as it can perform the following information processing. In addition, the connection relationship between the processing units provided in the control unit 33 is not limited to that illustrated in FIG. 5 and the processing units may have other connection relationship therebetween.

The receiving unit 34 receives a web page acquisition request from the terminal device 100. For example, the receiving unit 34 receives an HTTP request as the web page acquisition request.

When the receiving unit 34 receives the web page acquisition request, the distribution unit 35 distributes a web page to the terminal device 100. Specifically, the distribution unit 35 acquires a web page corresponding to the acquisition request from the content storage unit 32 and distributes the acquired web page to the terminal device 100. As described above, the web page stored in the content storage unit 32 includes a command to acquire information displayed in each tile and to display the acquired information and an advertisement acquisition command. Therefore, when receiving the web page C10, the terminal device 100 acquires information from, for example, an arbitrary server (not illustrated), arranges the acquired information in a corresponding tile, and displays the acquired information. In addition, the terminal device 100 transmits an advertisement distribution request to the advertisement distribution server 20, receives advertising content as a response, and displays the advertising content in the advertisement frame 50.

6. Structure of Terminal Device

Figure 6:
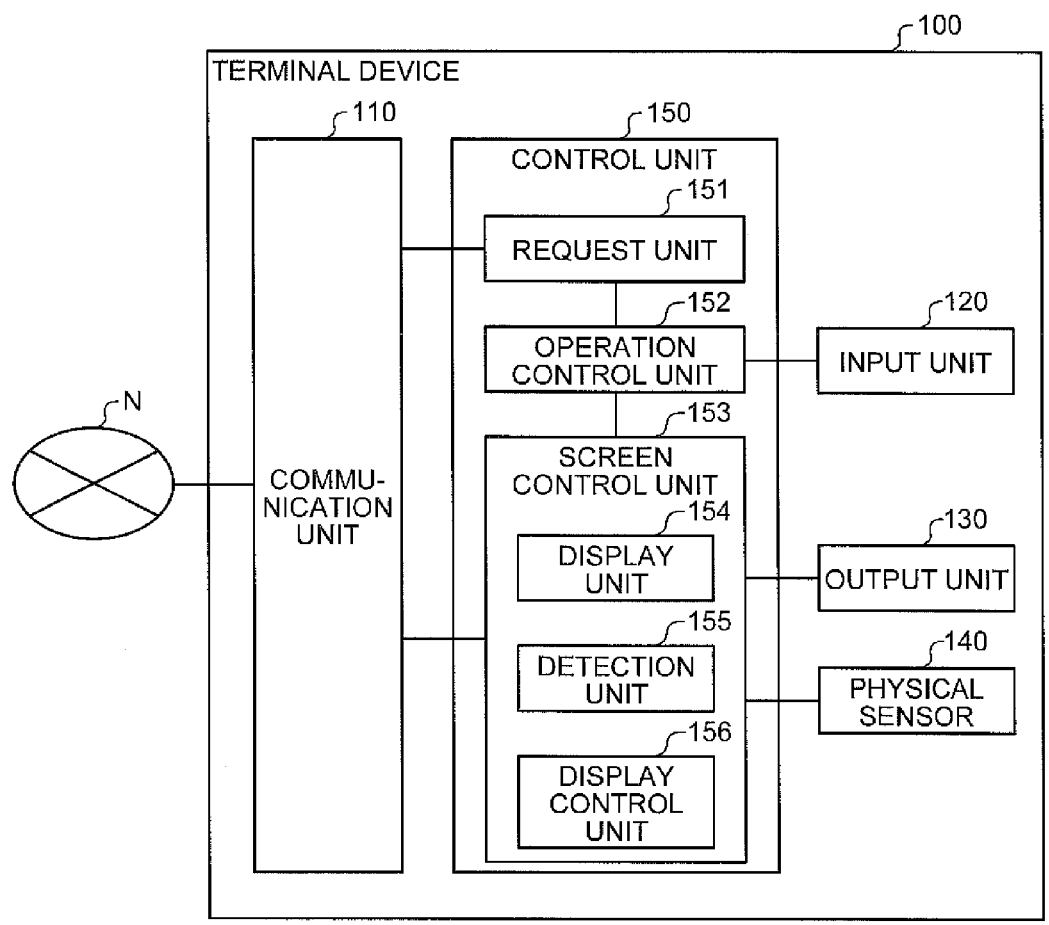
FIG. 6 is a diagram illustrating an example of the structure of a terminal device according to the embodiment.

Next, the structure of the terminal device 100 according to the embodiment will be described with reference to FIG. 6. FIG. 6 is a diagram illustrating an example of the terminal device according to the embodiment. As illustrated in FIG. 6, the terminal device 100 includes a communication unit 110, an input unit 120, an output unit 130, a physical sensor 140, and a control unit 150.

The communication unit 110 is, for example, an NIC. The communication unit 110 is connected to the network N wirelessly or in a wired manner and transmits and receives information to and from the advertisement distribution server 20 or the content distribution server 30.

The input unit 120 is an input device that receives various operations from the user. For example, the input unit 120 is, for example, a keyboard, a mouse, or an operation key. The output unit 130 is a display device for displaying various kinds of information. For example, the output unit 130 is a liquid crystal display. When a touch panel is provided in the terminal device 100, the input unit 120 and the output unit 130 are integrated with each other.

The physical sensor 140 is a sensor that detects the physical state of the terminal device 100. For example, the physical sensor 140 is a gyro sensor that measures the inclination of the terminal device 100 in three axial directions. The physical sensor 140 is not limited to a gyro sensor and may be any sensor, such as an acceleration sensor, a temperature sensor, a volume sensor, or a brightness sensor.

For example, a CPU or an MPU executes various programs (corresponding to an example of a display program) stored in a storage device of the terminal device 100, using RAM as a work area, to implement the function of the control unit 150. For example, various programs correspond to an application program which is called a web browser. In addition, the control unit 150 is implemented by an integrated circuit, such as an ASIC or an FPGA.

As illustrated in FIG. 6, the control unit 150 includes a request unit 151, an operation control unit 152, and a screen control unit 153 and implements or performs the following information processing function or operation. The internal structure of the control unit 150 is not limited to that illustrated in FIG. 6 and the control unit 150 may have any other structures as long as it can perform the following information processing. In addition, the connection relationship between the processing units provided in the control unit 150 is not limited to that illustrated in FIG. 6 and the processing units may have other connection relationship therebetween.

When receiving the URL of the web page C10 from the operation control unit 152, the request unit 151 transmits an acquisition request of the web page C10 indicated by the received URL to the content distribution server 30. In addition, the request unit 151 transmits an acquisition request of information to be displayed in each tile of the web page C10 to an arbitrary server (not illustrated). When an advertisement acquisition command is included in the web page received from the content distribution server 30, the request unit 151 transmits an advertising content acquisition request to the advertisement distribution server 20.

The operation control unit 152 performs various control processes in response to the operation of the user received through the input unit 120. For example, when the user uses the input unit 120 to perform an operation for displaying the web page C10, the operation control unit 152 outputs the URL of the web page C10 to be displayed to the request unit 151. In addition, the operation control unit 152 outputs the content of the operation of the user which has been input through the input unit 120 to the screen control unit 153. When the web page C10 received by the screen control unit 153 includes a command to acquire information to be arranged in each tile or an advertisement acquisition command, the operation control unit 152 instructs the request unit 151 to transmit an acquisition request of the information to be arranged in each tile to an arbitrary server and instructs the request unit 151 to transmit an advertising content acquisition request to the advertisement distribution server 20.

The screen control unit 153 performs a process of displaying the received web page and advertising content on the output unit 130. For example, the control unit 150 executes the control information which is distributed together with the advertising content to operate the screen control unit 153 as a display unit 154, a detection unit 155, and a display control unit 156, as illustrated in FIG. 6. For example, a CPU or an MPU executes the control information, using RAM as a work area, to implement the functions of the display unit 154 and the display control unit 156. That is, the display unit 154 performs the above-mentioned display process and the detection unit 155 performs the above-mentioned detection process, and the display control unit 156 performs the above-mentioned change process.

The display unit 154 displays the advertising content item C11 on the output unit 130. Specifically, when the web page C10, the advertising content item C11a, and the advertising content item C11b are received in response to the request from the request unit 151, the display unit 154 displays the web page C10 on the output unit 130.

The display unit 154 arranges the advertising content item C11a in the advertisement frame 50 and displays the advertising content item C11a. In addition, the display unit 154 arranges the advertising content item C11b on the back side of the advertising content item C11b. That is, in an initial state, the display unit 154 displays the web page C10 and the advertising content item C11 such that only the advertising content item C11a is displayed in the advertisement frame 50.

When the content of the operation of the user is received from the operation control unit 152, the display unit 154 controls the display content of the output unit 130 on the basis of the received operation of the user. For example, in a case in which the web page C10 is displayed in the entire display region of the output unit 130, when a scroll operation is performed in the vertical direction, the display unit 154 scrolls the web page C10.

In a case in which the advertisement frame 50 corresponds to carousel display, when a scroll operation is performed in the horizontal direction, the display unit 154 changes the advertising content to be displayed in the advertisement frame 50. For example, the terminal device 100 acquires the advertising content items C11, C12, and C13 illustrated in FIG. 4. In this case, the display unit 154 arranges, for example, the advertising content items C11, C12, and C13 on the screen in the horizontal direction and changes the advertising content to be displayed in the advertisement frame 50 whenever the user performs a scroll operation in the horizontal direction on the advertisement frame 50. The carousel display is a process which is performed separately from the switching of the advertising content that is performed together with the rendering process.

The display unit 154 changes the display mode of each of the advertising content items C11a and C11b displayed in the advertisement frame 50 in response to an instruction from the display control unit 156. For example, the display unit 154 newly displays the advertising content item C11b in the advertisement frame 50 while performing a rendering process of changing the display mode of the advertising content item C11a, in response to an instruction from the display control unit 156.

When the user selects advertising content, the display unit 154 displays predetermined content corresponding to the selected advertising content. For example, the display unit 154 sets the URLs which are registered in the advertisement database 24 illustrated in FIG. 3 so as to be associated with the advertising content items C11a and C11b as links in the advertising content items C11a and C11b.

When the user taps the advertising content item C11a, the display unit 154 displays content which is indicated by the URL set in the advertising content item C11a (for example, a landing page corresponding to the advertising content item C11a). When the user taps the advertising content item C11b, the display unit 154 displays content which is indicated by the URL set in the advertising content item C11b. Here, content items corresponding to each of the advertising content items C11a and C11b may be the same content or different content items.

When the user taps the screen while the display control unit 156 is performing control to change the display mode of the advertising content item C11a or the display mode of the advertising content item C11b, the display unit 154 displays new content corresponding to the content displayed at the tapped position. For example, the display unit 154 specifies the transmittance of the advertising content item C11a which is displayed at the position tapped during the rendering process.

When the specified transmittance is equal to or less than 50%, the terminal device 100 determines that the advertising content displayed at the tapped position is the advertising content item C11a. On the other hand, when the specified transmittance is greater than 50%, the terminal device 100 determines that the advertising content displayed at the tapped position is the advertising content item C11b. Then, the terminal device 100 displays content corresponding to the determined advertising content item C11. It is assumed that the content corresponding to the advertising content item C11 is content which is acquired from an arbitrary server (not illustrated) and is indicated by the URL set in each of the advertising content items C11a and C11b.

The detection unit 155 detects the physical state of the terminal device 100. For example, when the physical sensor 140 is used to detect the inclination of the terminal device 100, the detection unit 155 notifies the display control unit 156 of the detection result indicating that the terminal device 100 is inclined.

The detection unit 155 may detect the inclination direction of the terminal device 100 and the inclination angle of the terminal device 100 and notify the display control unit 156 of the detected direction and angle. In addition, when the inclination angle of the terminal device 100 is equal to or greater than a predetermined threshold value, the detection unit 155 may notify the display control unit 156 of the detection result indicating that the terminal device 100 is inclined.

The detection unit 155 may detect an impact applied to the terminal device 100 using the physical sensor 140. For example, the detection unit 155 may measure the acceleration of the terminal device 100 using the physical sensor 140. When a variation in the measured acceleration is greater than a predetermined threshold value, the detection unit 155 may notify the display control unit 156 of the detection result indicating that an impact is applied to the terminal device 100.

For example, the detection unit 155 may detect a predetermined operation of the user using the input unit 120 and the physical sensor 140. Specifically, when the input unit 120 detects the touch of the user on the screen at the same time as the physical sensor 140 detects an impact, the detection unit 155 may notify the display control unit 156 of the detection result indicating that the user knocks the screen.

The process performed by the detection unit 155 is illustrative. The detection unit 155 can detect the arbitrary physical state of the terminal device 100 using an arbitrary sensor provided in the terminal device 100.

The display control unit 156 directs the display unit 154 to display a new advertising content item C11b in the advertisement frame 50 while changing the display mode of the advertising content item C11a, on the basis of the detection result of the detection unit 155. Specifically, when the inclination of the terminal device 100 is detected, the display control unit 156 directs the display unit 154 to display a new advertising content item C11b while changing the display mode of the advertising content item C11a.

For example, the display control unit 156 changes the display mode of the advertising content item C11a such that aspects of change in the transmittance of each small regions of the advertising content item C11a are different from each other and displays the advertising content item C11b. Specifically, the display control unit 156 performs a process which gradually increases the transmittance of each small region of the advertising content item C11a from 0% to 100% such that the advertising content item C11a is invisible and displays the advertising content item C11b in the advertisement frame 50. In addition, the display control unit 156 performs a process which displays a white line having a predetermined transmittance and a predetermined thickness, gradually increases the transmittance of each white line, and gradually reduces the thickness of each white line. That is, the display control unit 156 performs the above-mentioned rendering process.

When the advertising content item C11b is displayed in the advertisement frame 50 and the inclination of the terminal device 100 is detected, the display control unit 156 performs the following rendering process. That is, the display control unit 156 performs a process which displays a white line having a predetermined transmittance and a predetermined thickness around each small region of the advertising content item C11a, gradually increases the transmittance of each white line, and gradually reduces the thickness of each white line. In addition, the display control unit 156 gradually reduces the transmittance of the advertising content item C11a included in the small region and displays the advertising content item C11a in the advertisement frame 50 while changing the display mode of the advertising content item C11b. The display control unit 156 may arrange the advertising content item C11b on the front side of the advertising content item C11a and perform the rendering process for the advertising content item C11b to switch the advertising content item C11.

The display control unit 156 may display a new advertising content item C11b while changing the display mode of the advertising content item C11a, on the basis of the detected inclination of the terminal device 100. For example, the display control unit 156 may change the display mode of the advertising content item C11a, depending on the inclination direction of the terminal device 100. Specifically, when the terminal device 100 is inclined to the left side with respect to the Y-axis, the display control unit 156 may start the rendering process in the order from the small region which is located on the right side of the screen to the small region which is located on the left side of the screen to change the display mode of the advertising content item C11a from the right side to the left side of the screen.

The display control unit 156 may change the display mode of the advertising content item C11a, depending on the inclination angle detected by the detection unit 155. For example, when the inclination angle is equal to or greater than a first threshold value, the display control unit 156 starts the rendering process in the order from the small region which is located on the right side of the screen to the small region which is located on the left side of the screen at a first time interval. On the other hand, when the inclination angle is equal to or greater than a second threshold value greater than the first threshold value, the display control unit 156 starts the rendering process in the order from the small region which is located on the right side of the screen to the small region which is located on the left side of the screen at a second time interval shorter than the first time interval. That is, the display control unit 156 may increase the change speed of the display mode of the advertising content item C11a as the detected inclination angle increases.

The display control unit 156 may change the display mode of the advertising content item C11b such that aspects of change in the transmittance of each small region of the advertising content item C11b are different from each other and may display the advertising content item C12b. For example, the display control unit 156 arranges the advertising content item C11a on the back side of the advertising content item C11b and sets the transmittance of the advertising content item C11b to 100%. Then, when the inclination of the terminal device 100 is detected, the display control unit 156 may perform a process which gradually reduces the transmittance of each small region of the advertising content item C11b from 100% to 0% and displays the advertising content item C11b in the advertisement frame 50.

As such, when the rendering process is performed, the display control unit 156 may display the advertising content item C11a on the front side or the back side of the advertising content item C11b. That is, the display control unit 156 can change the transmittance of the advertising content item C11a or the advertising content item C11b to switch the advertising content item C11, regardless of the arrangement relationship between the advertising content item C11a and the advertising content item C11b.

As such, the terminal device 100 displays the advertising content item C11a and displays a new advertising content item C11b while changing the display mode of the advertising content item C11a, on the basis of the detection result of the physical state of the terminal device 100. Therefore, the terminal device 100 can perform the rendering process and switch the advertising content item C11, according to the physical state of the terminal device 100. As a result, it is possible to make the user interested in an advertisement.

7. Variation in Rendering Process

The rendering process performed by the terminal device 100 has been described above using the display mode illustrated in FIG. 1. Specifically, in the above-mentioned example, the terminal device 100 performs the process which arranges the white line having a predetermined transmittance and a predetermined thickness around the small region, gradually increases the transmittance of a region included in the small region and the transmittance of the white line arranged around the small region, and gradually reduces the thickness of the white line. However, the embodiment is not limited to the above-mentioned structure. Next, a variation in the rendering process performed by the terminal device 100 will be described. For example, the display control unit 156 controls the display unit 154 to implement the following rendering process.

7-1. Variation in Display Area

For example, the terminal device 100 may perform a rendering process which gradually reduces the area of the display region of the advertising content item C11a or gradually increases the area of the display region of the advertising content item C11b, on the basis of the detection result, and displays the advertising content item C11b. For example, the terminal device 100 may arrange the advertising content item C11b on the back side of the advertising content item C11a, perform a rendering process which gradually reduces the area of the display region of the advertising content item C11a when the inclination of the terminal device 100 is detected, and display the advertising content item C11b.

In addition, in the initial state, the terminal device 100 arranges the advertising content item C11a on the back side of the advertising content item C11b, sets the width of the display region of the advertising content item C11b to 0, and displays the advertising content item C11a. Then, when the inclination of the terminal device 100 is detected, the terminal device 100 may perform a rendering process which gradually increases the width of the display region of the advertising content item C11b and display the advertising content item C11b.

7-2. Slit Display Process

The terminal device 100 may perform a rendering process including a slit display process which gradually reduces the width of each of a plurality of regions, into which the advertising content item C11a is divided, or gradually increases the width of each of a plurality of regions, into which the advertising content item C11b is divided, and displays the advertising content item C11b. Next, the rendering process including the slit display process will be described with reference to FIG. 7.

Figure 7:
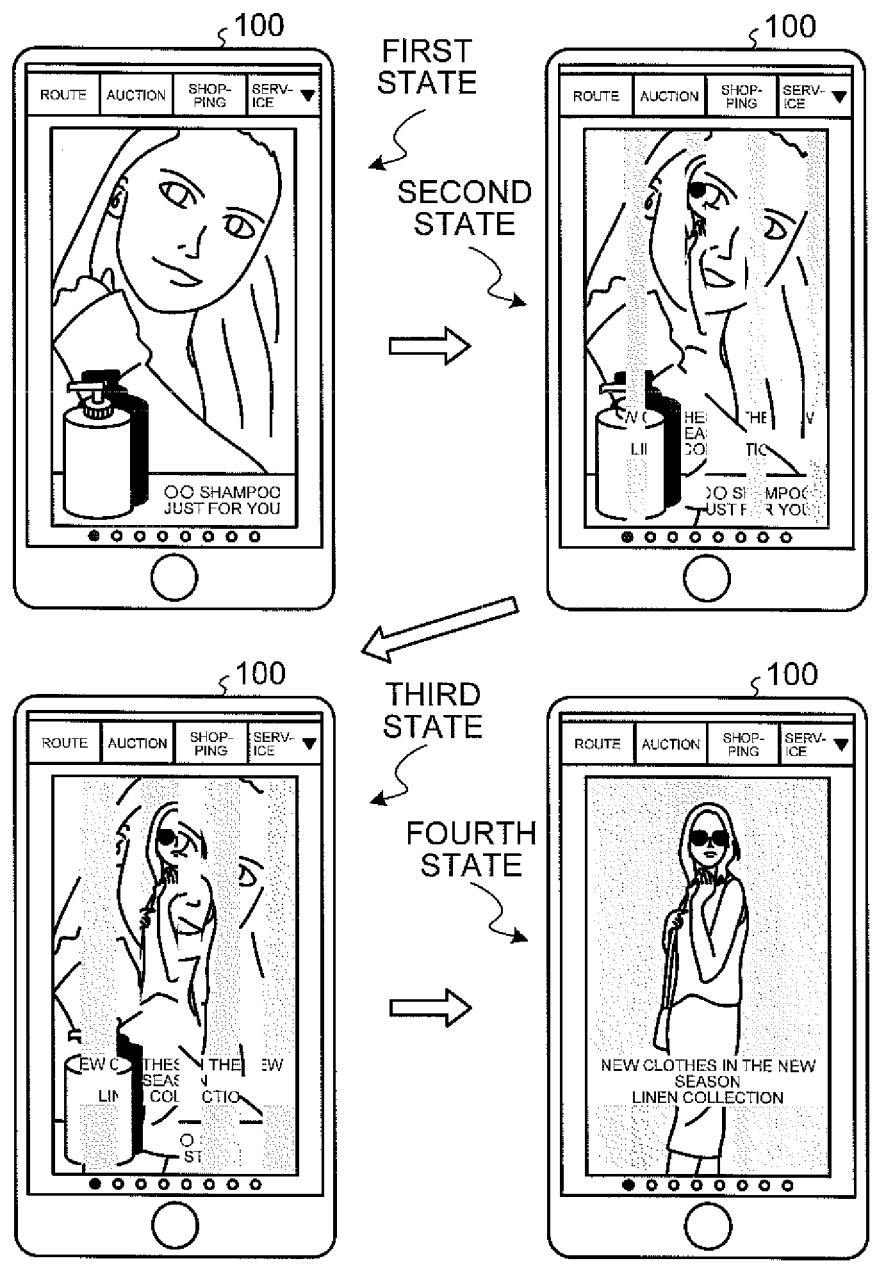
FIG. 7 is a diagram illustrating an example of a slit display process performed by the terminal device according to the embodiment.

FIG. 7 is a diagram illustrating an example of the slit display process performed by the terminal device according to the embodiment. In the example illustrated in FIG. 7, an example of the rendering process including the slit display process performed by the terminal device 100 is divided into first to fourth states. In the first state, the terminal device 100 performs the same process as the rendering process illustrated in FIG. 1 and thus the description thereof will not be repeated.

For example, the terminal device 100 detects the inclination of the terminal device 100. Here, when the user inclines the terminal device 100 to the left side with respect to the Y-axis, the terminal device 100 starts the rendering process including the slit display process as illustrated in the second state. Specifically, the terminal device 100 divides the advertising content item C11a into a plurality of regions (for example, four regions) having the same width in the horizontal direction and reduces the display width of each region from the right side to the left side of the screen.

As illustrated in the third state, the terminal device 100 gradually reduces the display width of each region of the advertising content item C11a to gradually switch the advertising content displayed in the advertisement frame 50 from the advertising content item C11a to the advertising content item C11b. Then, the terminal device 100 reduces the width of each region to 0 such that only the advertising content item C11b is displayed in the advertisement frame 50.

This process can be implemented by gradually increasing the width of each of the plurality of regions into which the advertising content item C11b is divided. For example, the terminal device 100 arranges the advertising content item C11a on the back side of the advertising content item C11b, divides the advertising content item C11b into a plurality of regions, sets the width of each region to 0, which results in the first state illustrated in FIG. 7. Then, when the inclination of the terminal device 100 is detected, the terminal device 100 may gradually increase the width of each region of the advertising content item C11b to perform the rendering process illustrated in the second to fourth states.

7-3. Time Interval Slit Display Process

The terminal device 100 may perform a rendering process including a time interval slit display process which changes the time when the width of each region is gradually reduced or the time when the width of each region is gradually increased for each region in the production display including the slit display process such that the slits of the advertising content item C11 are switched with time intervals.

Figure 8:
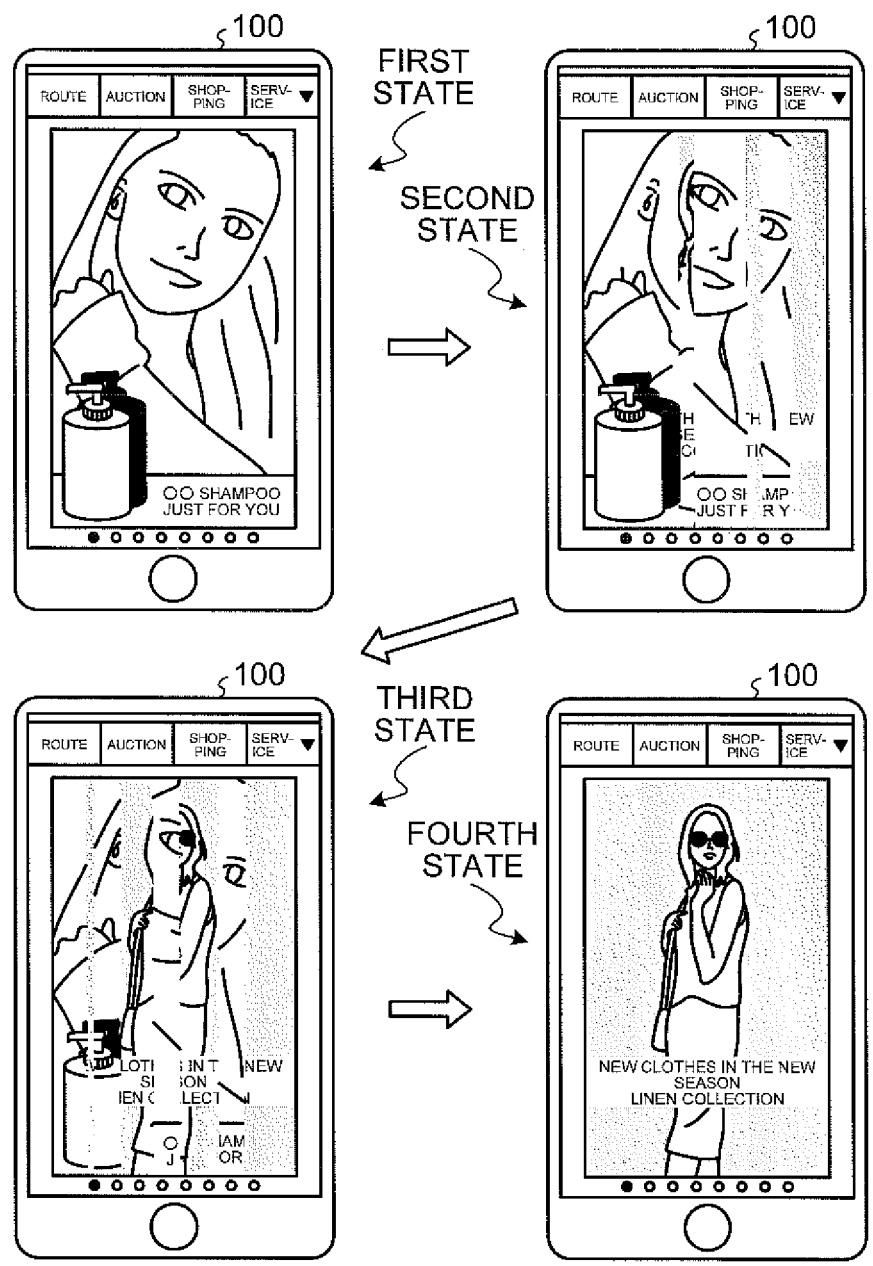
FIG. 8 is a diagram illustrating an example of a time interval slit display process performed by the terminal device according to the embodiment.

For example, FIG. 8 is a diagram illustrating an example of the time interval slit display process performed by the terminal device according to the embodiment. In the example illustrated in FIG. 8, an example of the rendering process including the time interval slit display process performed by the terminal device 100 is divided into first to fourth states. In the first state, the terminal device 100 performs the same process as the rendering process illustrated in FIG. 1 and thus the description thereof will not be repeated.

For example, when the user inclines the terminal device 100 to the left side with respect to the Y-axis, the terminal device 100 starts the rendering process including the time interval slit display process as illustrated in the second state. Specifically, the terminal device 100 divides the advertising content item C11a into a plurality of regions and starts a process which reduces the display width of each region in the order from the region which is located on the right side of the screen to the region which is located on the left side of the screen. That is, the terminal device 100 starts a process which reduces the display width of each region of the advertising content item C11a at a predetermined time interval in the order of the rightmost region of the screen, the second region from the right, the third region from the right, and the leftmost region of the screen.

As a result, as illustrated in the second and third states in FIG. 8, the terminal device 100 reduces the widths of the regions of the advertising content item C11a by different values. Then, as illustrated in the fourth state in FIG. 8, the terminal device 100 reduces the width of each region to 0 such that only the advertising content item C11b is displayed in the advertisement frame 50.

7-4. Variations in Slit Display Process and Time Interval Slit Display Process In the examples illustrated in FIGS. 7 and 8, the terminal device 100 performs the process which reduces the width of each region of the advertising content item C11a from the right side to the left side of the screen. However, the embodiments is not limited thereto. For example, the terminal device 100 may reduce the width of each region from the left side to the right side when the terminal device 100 is inclined to the right side. In addition, the terminal device 100 may perform a process which divides the display region into a plurality of regions and reduces the width of the display region of the advertising content item C11a or increases the width of the display region of the advertising content item C11b from the center of each region to both the left and right sides of each region.

The terminal device 100 may change the speed of change in the width of each region, depending on the inclination angle of the terminal device 100. For example, when the inclination angle is less than a predetermined threshold value, the terminal device 100 changes the width of each region at a predetermined speed. When the inclination angle is greater than the predetermined threshold value, the terminal device 100 changes the width of each region at a speed higher than the predetermined speed.

During the slit display process and the time interval slit display process, when the user taps the screen, the terminal device 100 determines whether the advertising content displayed at the tapped position is the advertising content item C11a or the advertising content item C11b. Then, when the displayed advertising content is the advertising content item C11a, the terminal device 100 displays content corresponding to the advertising content item C11a. When the displayed advertising content is the advertising content item C11b, the terminal device 100 displays content corresponding to the advertising content item C11b.

7-5. Variation in Transmittance

The terminal device 100 may display the advertising content item C11a, change the transmittance of the advertising content item C11a or the transmittance of the advertising content item C11b depending on the detection result, and newly display the advertising content item C11b. For example, the terminal device 100 may arrange the advertising content item C11b on the back side of the advertising content item C11a and increase the transmittance of the advertising content item C11a from 0% to 100% when the terminal device 100 is inclined such that the advertising content item C11b is displayed. For example, the terminal device 100 may arrange the advertising content item C11a on the back side of the advertising content item C11b and reduce the transmittance of the advertising content item C11b from 100% to 0% when the terminal device 100 is inclined such that the advertising content item C11b is displayed.

The terminal device 100 can change the transmittance in any aspect. For example, when the user inclines the terminal device 100 to the left side with respect to the Y-axis, the terminal device 100 may gradually change the transmittance of the advertising content item C11 from the left side to the right side of the screen. When the user inclines the terminal device 100 to the back side with respect to the X-axis, the terminal device 100 may gradually change the transmittance of the advertising content item C11 from the upper side to the lower side of the screen. The terminal device 100 may gradually change the transmittance of the advertising content item C11 from the center to the outside.

7-6. Rendering Process for Plural Content Items

The terminal device 100 may change the display mode of each of the advertising content item C11a and the advertising content item C11b to switch advertising content from the advertising content item C11a to the advertising content item C11b. For example, the terminal device 100 divides the advertising content item C11a into a plurality of regions, such as the small regions illustrated in FIG. 1 or the regions illustrated in FIGS. 7 and 8, and changes the display mode of each region such that the regions are displayed in different modes. Similarly, the terminal device 100 divides the advertising content item C11b into a plurality of regions and changes the display mode of each region such that the regions are displayed in different modes.

For example, the terminal device 100 arranges the advertising content item C11b on the back side of the advertising content item C11a and arranges a background image on the back side of the advertising content item C11b. The terminal device 100 gradually increases the transmittance of each region of the advertising content item C11a from 0% to 100%. In addition, the terminal device 100 gradually increases the transmittance of each region of the advertising content item C11b from 0% to a predetermined value and then returns the transmittance to 0%. According to this process, when the inclination of the terminal device 100 is detected, the terminal device 100 can perform a rendering process which displays the background image through the translucent advertising content item C11a and advertising content item C11b and then displays the advertising content item C11b.

7-7. Parallax Display

The terminal device 100 may perform a rendering process including a parallax display process which displays a plurality of advertising content items in any display mode and moves each advertising content item by different distances on the basis of the detection result. For example, the terminal device 100 may perform a rendering process which displays first advertising content and second advertising content so as to overlap each other and moves the first advertising content by a smaller distance than the second advertising content and may display the first advertising content and the second advertising content at the same time.

Figure 9:
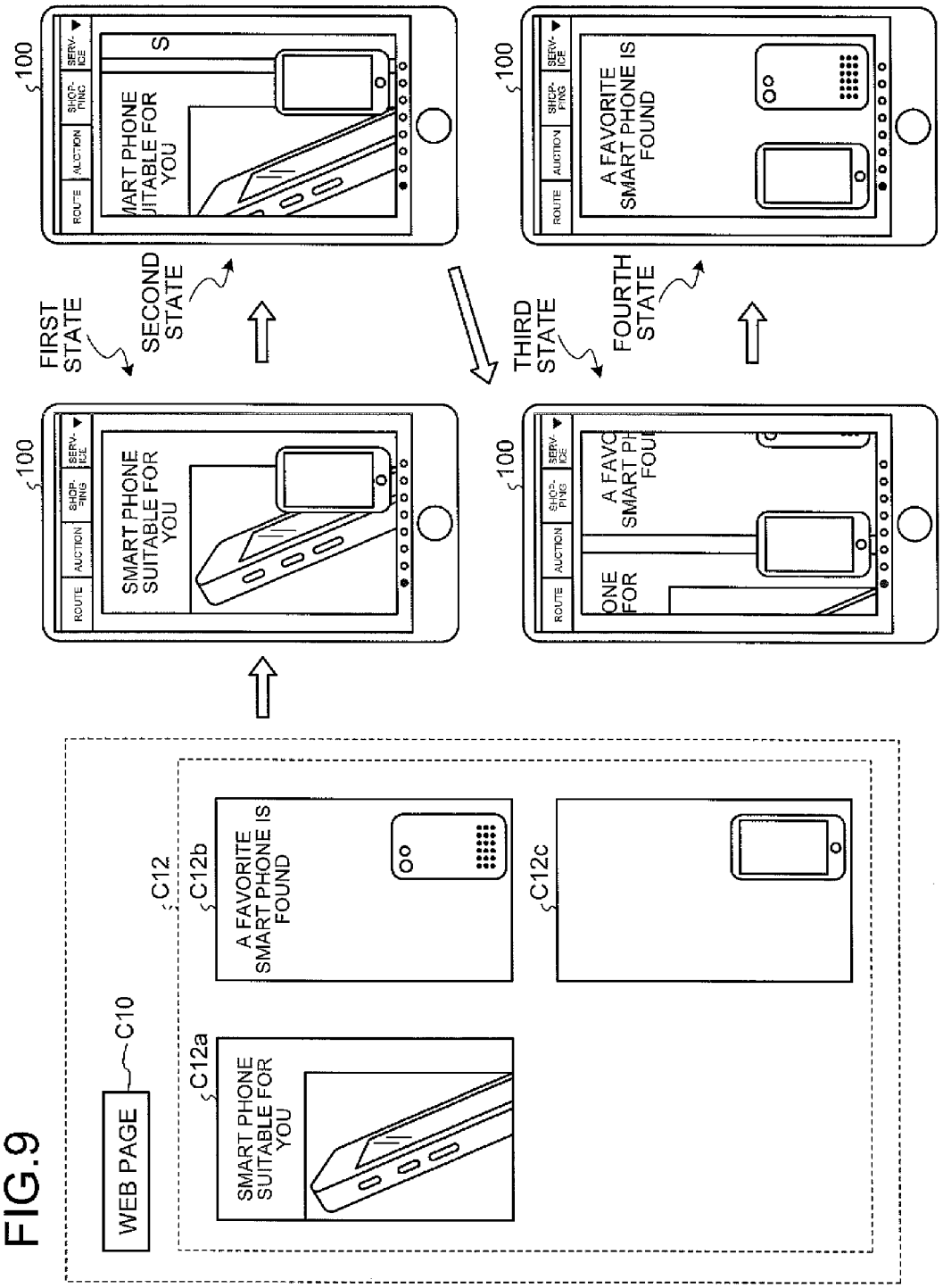
FIG. 9 is a diagram illustrating an example of a parallax display process performed by the terminal device according to the embodiment.

Next, an example of the rendering process including the parallax display process will be described with reference to FIG. 9. FIG. 9 is a diagram illustrating an example of the parallax display process performed by the terminal device according to the embodiment. In the example illustrated in FIG. 9, the rendering process including the parallax display process performed by the terminal device 100 is divided into first to fourth states.

For example, the terminal device 100 receives the web page C10 and advertising content item C12 including plurality of advertising content items C12a to C12c. Specifically, the advertising content item C12a is an image in which an advertisement copy "Smart phone suitable for you" and a smart phone that is to be advertised and is inclined in a front view are drawn. The advertising content item C12b is an image in which an advertisement copy "A favorite smart phone is found" is drawn and the image of the rear of the smart phone is arranged on the right side.

The advertising content item C12c is an image in which the front view of the smart phone is arranged on the right side of the screen. The advertising content item C12c is displayed as the first advertising content. The advertising content item C12a and the advertising content item C12b are displayed as the second advertising content.

When the advertising content item C12 is received, the terminal device 100 displays the advertising content item C12a in the advertisement frame 50 and arranges the advertising content item C11c in front of the advertising content item C11a. As a result, the terminal device 100 displays an image in which the advertising content item C12c overlaps the advertising content item C12a, as illustrated in the first state in FIG. 9.

When the terminal device 100 is inclined to the left side with respect to the Y-axis, the terminal device 100 moves the advertising content item C12a from the right side to the left side of the screen and moves the advertising content item C12b by the same distance as the advertising content item C12a from the left side to the right side of the screen, as illustrated in the second state in FIG. 9. That is, the terminal device 100 moves the advertising content item C12a and the advertising content item C12b as one image from the right side to the left side of the screen.

The terminal device 100 moves the advertising content item C12c from the right side to the left side of the screen by a smaller distance than the advertising content items C12a and C12b (for example, by a distance which is half the moving distance of the advertising content items C12a and C12b). In addition, the terminal device 100 continuously performs the above-mentioned process while the terminal device 100 is inclined to the left side with respect to the Y-axis, as illustrated in the third state in FIG. 9. As a result, the terminal device 100 displays an image in which the advertising content item C11c overlaps the advertising content item C12b, as illustrated in the fourth state in FIG. 9.

Specifically, the terminal device 100 displays an image in which the rear of the smart phone drawn in the advertising content item C12b and the front of the smart phone drawn in the advertising content item C12c are arranged side by side. When this rendering process is performed, the terminal device 100 can switch advertising content in such a way that a portion of the advertisement displayed in the first state is moved and becomes a portion of the advertisement displayed in the fourth state.

Next, an example of the process performed by the terminal device 100 in order to achieve the parallax display illustrated in FIG. 9 will be described. First, in the first state illustrated in FIG. 9, the terminal device 100 specifies the coordinates of the position where the advertising content item C12a is displayed on the screen as initial coordinates. For example, the terminal device 100 specifies the position of a vertex which is located on the upper left side of the advertising content item C12a, using a vertex which is located on the upper left side of the screen as the origin.

Then, when the terminal device 100 is inclined, the terminal device 100 moves the advertising content item C12a to the left side according to the inclination angle of the terminal device 100, as illustrated in the second and third states in FIG. 9. Then, the terminal device 100 specifies the amount of movement of the advertising content item C12a on the basis of the initial coordinates. Then, the terminal device 100 uses a value obtained by dividing the specified amount of movement by a predetermined value (for example, 2) as the amount of movement of the advertising content item C12c.

In addition, the terminal device 100 may use an arbitrary amount of movement based on the amount of movement of the advertising content item C12a as the amount of movement of the advertising content item C12c, in addition to the value obtained by dividing the amount of movement of the advertising content item C12a by the predetermined value. For example, the terminal device 100 may move the advertising content item C12c in an exponential manner with respect to the amount of movement of the advertising content item C12a or may apply different amounts of movement to a change from the first state to the second state, a change from the second state to the third state, and a change from the third state to the fourth state.

8. Flow of Process of Advertisement Distribution System

Figure 10:
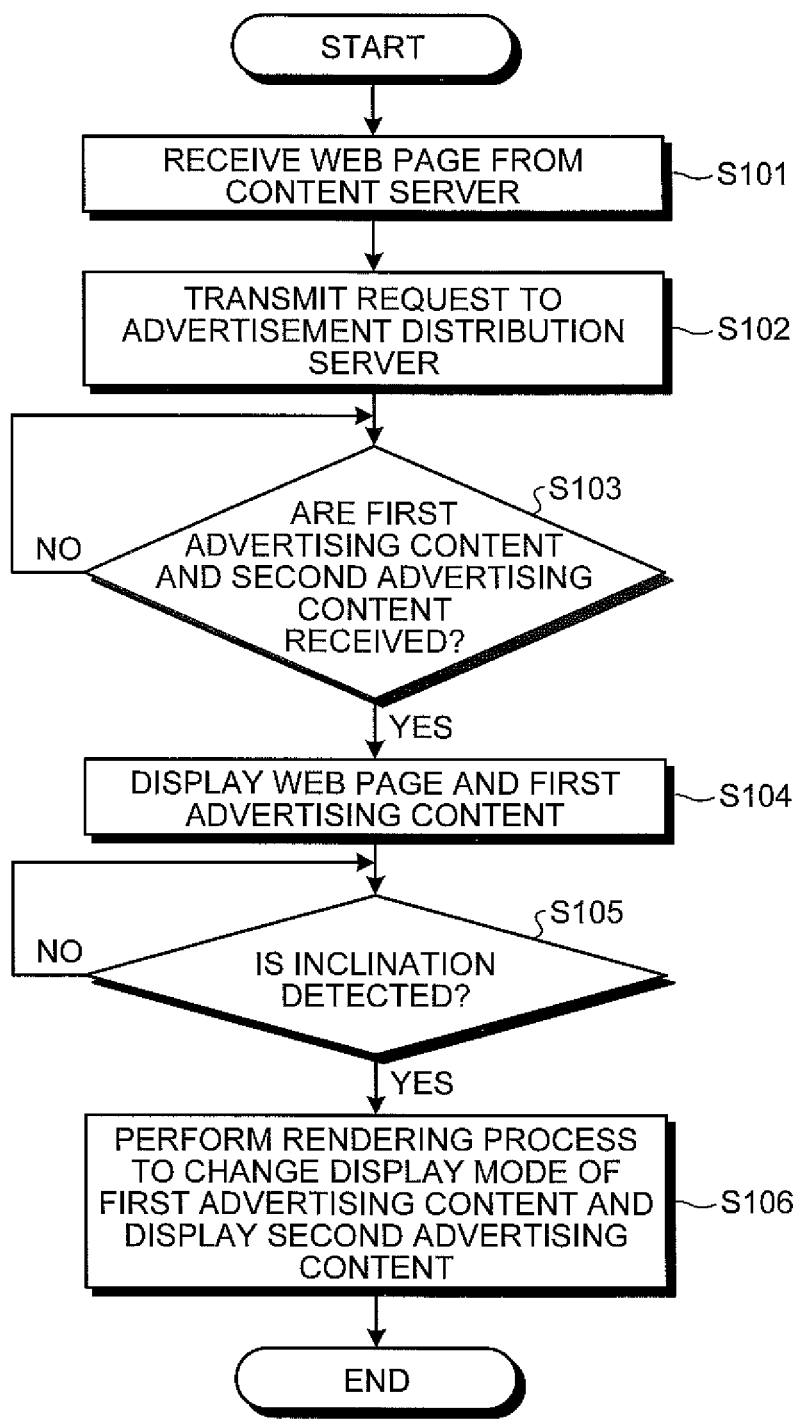
FIG. 10 is a flowchart illustrating an example of the flow of the display process performed by the terminal device according to the embodiment.

Next, the flow of the process of the terminal device 100 which executes the control information will be described with reference to FIG. 10. FIG. 10 is a flowchart illustrating the flow of the display process of the terminal device according to the embodiment.

In the example illustrated in FIG. 10, the terminal device 100 requests the content distribution server 30 to distribute the web page C10 in response to the operation of the user and receives the web page C10 from the content distribution server 30 (Step S101). Then, when the advertisement acquisition command is included in the distributed web page C10, the terminal device 100 transmits a distribution request to the advertisement distribution server 20 (Step S102). Then, the terminal device 100 determines whether the first advertising content and the second advertising content have been received (Step S103). For example, the terminal device 100 determines whether the advertising content item C11a and the advertising content item C11b have been received. Then, when it is determined that the first advertising content and the second advertising content have not been received (Step S103: No), the terminal device 100 performs Step S103 again.

When the first advertising content and the second advertising content have been received (Step S103: Yes), the terminal device 100 displays the web page and displays the received first advertising content in the advertisement frame 50 (Step S104). Then, the terminal device 100 determines whether the physical sensor 140 detects the inclination of the terminal device 100 (Step S105). When the inclination of the terminal device 100 is detected (Step S105: Yes), the terminal device 100 performs the rendering process to change the display mode of the first advertising content and displays the second advertising content (Step S106). Then, the terminal device 100 ends the process. On the other hand, when the inclination of the terminal device 100 is not detected (Step S105: No), the terminal device 100 determines whether the inclination is detected again (Step S105).

9. Modifications

The advertisement distribution system 1 according to the above-described embodiment is not limited to the above-described embodiment and may be modified in various ways. Hereinafter, other embodiments of the advertisement distribution system 1 will be described.

9-1. For Inclination

When the inclination of the terminal device 100 is detected, the terminal device 100 changes the display mode of the advertising content items C11 and C12. However, the embodiment is not limited thereto. For example, when the detected inclination is equal to or greater than a predetermined threshold value, the terminal device 100 may change the display mode of the advertising content items C11a and C11b.

The terminal device 100 may change the area of the display region of each content item C11, depending on the inclination direction of the terminal device 100. For example, when the terminal device 100 is inclined to the back side with respect to the X-axis, the terminal device 100 may apply, for example, a process of changing the display mode of the small region, a slit display process, a time interval slit display process, and a process of changing transmittance from the lower side to the upper side of the screen.

The terminal device 100 may change the display mode of the advertising content items C11 and C12 using different rendering processes, depending on the inclination angle of the terminal device 100. For example, when the inclination angle of the terminal device 100 is equal to or greater than a first threshold value, the terminal device 100 may change the display mode of the advertising content item C11 using the rendering process illustrated in FIG. 7 or FIG. 8. When the inclination angle of the terminal device 100 is equal to or greater than a second threshold value greater than the first threshold value, the terminal device 100 may change the display mode of the advertising content item C11 using the rendering process illustrated in FIG. 1.

The terminal device 100 may change the progress of the rendering process, depending on the inclination angle of the terminal device 100. For example, until the terminal device 100 is inclined at an angle of 90 degrees in a predetermined direction, the terminal device 100 changes the transmittance of the content item C11a or the width of the display region of the content item C11a, depending on the inclination angle of the terminal device 100. Then, when the terminal device 100 is inclined at an angle of 90 degrees in a predetermined direction, the terminal device 100 may perform the rendering process to the end to switch the content item C11a to the content item C11b.

When the terminal device 100 is inclined for a predetermined period of time or more, the terminal device 100 may change the rendering process. In this state, for example, when the user touches the screen of the output unit 130 or when the user removes a finger from the screen, the terminal device 100 may display a corresponding landing page.

9-2. For Physical Sensor

In the above-mentioned example, the terminal device 100 detects the inclination of the terminal device 100 using the physical sensor 140 and performs the rendering process on the basis of the detection result. However, the embodiment is not limited thereto. For example, the terminal device 100 measures an arbitrary physical state of the terminal device 100 which can be measured by the physical sensor 140, such as the acceleration of the terminal device 100, an impact applied to the terminal device 100, a predetermined operation, the ambient temperature of the terminal device, illuminance, and volume, using the physical sensor 140. Then, the terminal device 100 may perform the above-mentioned rendering process on the basis of an arbitrary measurement result. The terminal device 100 may combine arbitrary rendering processes on the basis of the measurement result.

For example, the rendering process performed by the terminal device 100 may vary depending on, for example, the content of the operation for the terminal device 100, ambient temperature, illuminance, and volume. The terminal device 100 detects whether the user is walking on the basis of, for example, vibration. When it is determined that the user is walking, the terminal device 100 performs a process of repeating the first state and the second state illustrated in FIG. 1 and FIGS. 7 to 9 according to vibration. When the user inclines the terminal device 100 at a large angle, the terminal device 100 may perform the rendering process to the end to switch advertising content.

9-3. For Display Mode

The rendering process described in the embodiment or the display mode of the advertising content items C11 and C12 is illustrative and the embodiment is not limited thereto. For example, in the initial state, the terminal device 100 displays the screen during the rendering process as in the second state or the third state illustrated in FIG. 1. The terminal device 100 may change the display mode of the advertising content item C11 to the first state or the fourth state according to the detected inclination direction.

For example, when the terminal device 100 is inclined to the right side with respect to the Y-axis, the terminal device 100 may sequentially change the display mode of the advertising content item C11 to the third state, the second state, and the first state and display the advertising content item C11a. When the terminal device 100 is inclined to the left side with respect to the Y-axis, the terminal device 100 may sequentially change the display mode of the advertising content item C11 to the third state and the fourth state and display the advertising content item C11b.

The terminal device 100 may display any other advertising content. For example, in the initial state, the terminal device 100 may display advertising content in which only the face of a model is drawn. When the inclination of the terminal device 100 is detected, the terminal device 100 may perform the rendering process and a display process of displaying advertising content in which the whole body of the model is drawn.

In another example, the advertising content item C11 includes the advertising content item C11b and advertising content including the image of women who are dressed in different colors. In this example, in the initial state, the terminal device 100 may display advertising content including the image of a woman who wears predetermined clothes. When the inclination of the terminal device 100 is detected, the terminal device 100 may perform the rendering process and a process of displaying advertising content including the image of women who are dressed in different colors.

The terminal device 100 may perform the rendering process and a process of switching the displayed advertising content to advertising content which is provided by the same advertiser or to advertising content which is provided by different advertisers. That is, for example, any image or any advertisement copy may be arranged in the advertising content items C11 and C12. In addition, the advertising content items C11 and C12 may include an arbitrary number of advertising content items.

9-4. For Rendering Process

In the above-mentioned example, the terminal device 100 performs the rendering process of changing, for example, the width of the display region of the advertising content item C11 or the transmittance of the advertising content item C11 or the rendering process of moving advertising content C12. However, the embodiment is not limited thereto. For example, the terminal device 100 may change the brightness, chroma, color, and transmittance of the advertising content items C11 and C12, depending on the detected inclination direction or inclination angle. During the rendering process, the terminal device 100 may arbitrarily display figures, images, and colors in the advertising content items C11 and C12.

That is, when switching the displayed advertising content from the first advertising content to the second advertising content, the terminal device 100 may use a rendering process of changing the display mode of the first advertising content to any mode as long as it can make the user interested in the second advertising content.

The terminal device 100 may perform attention display in order to make the user aware of the execution of the rendering process when the terminal device 100 is inclined. For example, when the user touches the screen with a finger, with the advertisement frame 50 displayed on the screen, the terminal device 100 may perform, as the attention display, a display process of displaying, for example, figures or characters for urging the user to incline the terminal device 100 at the touch position of the finger of the user.

9-5. For Selection of Advertising Content

In the above-mentioned example, the terminal device 100 displays different content items, such as different landing pages, when the user selects the advertising content item C11a and when the user selects the advertising content item C11b. However, the terminal device 100 may display the same landing page when the user selects the advertising content item C11a and when the user selects the advertising content item C11b. In addition, the terminal device 100 may display the same landing page when the user selects the advertising content item C11a and when the user selects the advertising content item C11b and may change the content arranged in the landing page, such as a moving image, to different content items.

The landing page displayed by the terminal device 100 may vary, depending on the degree of progress of the rendering process when the user selects the advertising content items C11 and C12. For example, in the first and second states illustrated in FIG. 1, when the user taps the advertisement frame 50, the terminal device 100 may display the landing page corresponding to the advertising content item C11a. In the second and third states illustrated in FIG. 1, when the user taps the advertisement frame 50, the terminal device 100 may display the second landing page corresponding to the advertising content item C11b.

9-6. For Log

The terminal device 100 may acquire the log of the advertising content which is actually displayed or the log of the advertising content selected by the user. For example, when the user ends the display of the web page C10 without inclining the terminal device 100, the terminal device 100 acquires a log indicating that only the advertising content item C11a has been browsed. On the other hand, when the user inclines the terminal device 100 to switch the advertising content item C11a to the advertising content item C11b, the terminal device 100 acquires a log indicating that the advertising content item C11a and the advertising content item C11b have been browsed. When the user taps the advertisement frame 50 in the initial state or during the rendering process, the terminal device 100 specifies the advertising content selected by the user using the above-mentioned process and acquires a log indicating the specified advertising content is selected.

As such, the log acquired by the terminal device 100 is useful to update the CTR of each advertising content item or to inform the advertiser of the effect of advertisement. In addition, the log acquired by the terminal device 100 may be used to change the content arranged in the landing page. For example, when the user selects the advertising content items C12a to 12c, the terminal device 100 acquires the same landing page and notifies the server which distributes the landing page of the advertising content selected by the user. In this case, the server which distributes the landing page specifies content, such as a moving image corresponding to the notified advertising content, and instructs the terminal device 100 to arrange the specified content in the landing page. As a result, the terminal device 100 can display content corresponding to the advertising content selected by the user.

The terminal device 100 may change the order in which the advertising content items C12a to C12c are displayed, depending on the state of the acquired log. For example, in FIG. 9, the terminal device 100 may display the first state as the initial state when the CTR of the advertising content item C12a is greater than the CTR of the advertising content item C12b and may display the fourth state as the initial state when the CTR of the advertising content item C12b is greater than the CTR of the advertising content item C12a.

When the minimum number of times content is displayed is set in each of the advertising content items C12a to 12c, the terminal device 100 may change the advertising content to be displayed first, depending on the difference (that is, the number of advertisements in stock) between the number of times content is currently displayed and the minimum number of times content is displayed. For example, when the number of advertising content items C12a in stock is less than the number of advertising content items C12b in stock, the terminal device 100 may display the fourth state illustrated in FIG. 9 as the initial state.

The terminal device 100 may change the landing page of the advertising content item C12 on the basis of the state of the log or the number of advertisements in stock. For example, when the CTR of the advertising content item C12a is greater than the CTR of the advertising content item C12b, the terminal device 100 may display the landing page corresponding to the advertising content item C12a even though the advertising content items C12b and C12c are selected.

As such, in the process based on the state of the log and the log, the terminal device 100 may treat the advertising content items C12a to 12c as one advertisement or as different advertisements. In addition, the terminal device 100 can combine the above-mentioned processes in a range without contraction to perform an advertisement display process and a landing page change process according to the log.

9-7. For Control Information

The terminal device 100 performs the above-mentioned display process, using the control information which is distributed together with the advertising content by the advertisement distribution server 20. However, the embodiment is not limited thereto. For example, the terminal device 100 may receive the control information together with the web page from the content distribution server 30 and receive a display instruction together with advertising content from the advertisement distribution server 20. Then, the terminal device 100 may execute the control information received from the content distribution server 30 and change the display mode of the advertising content in response to the received display instruction.

The terminal device 100 may download in advance an application which causes the terminal device 100 to perform, for example, a process of displaying the web page C10 and the above-mentioned rendering process and execute the application to implement the above-mentioned processes.

9-8. For Advertising Content and Web Page

In the above-described embodiment, the advertising content is displayed in the advertisement frame of the web page. However, the display position of the advertising content is not limited to the web page. For example, the advertising content may be displayed on a screen of a mobile phone game. In addition, the terminal device 100 may perform the above-mentioned processes for any content other than the advertising content.

9-9. Structure of Device

In the above-described embodiment, the advertisement distribution system 1 includes the advertisement distribution server 20 and the content distribution server 30. The advertisement distribution server 20 and the content distribution server 30 may be integrated into one device. In this case, the advertisement distribution server 20 illustrated in FIG. 3 includes, for example, the content storage unit 32, the receiving unit 34, and the distribution unit 35 illustrated in FIG. 5. When receiving a web page acquisition request from the terminal device 100, the advertisement distribution server 20 distributes advertising content and a web page without an advertisement acquisition command to the terminal device 100.

In the above-described embodiment, advertising content is distributed from the advertisement distribution server 20 to the terminal device 100. However, the content distribution server 30 may acquire advertising content from the advertisement distribution server 20. In this case, the request receiving unit 26 of the advertisement distribution server 20 receives an advertising content acquisition request from the content distribution server 30. The advertisement distribution server 20 distributes advertising content to the content distribution server 30. The content distribution server 30 distributes the advertising content acquired from the advertisement distribution server 20 and a web page without an advertisement acquisition command to the terminal device 100.

9-10. Recording of Operation of Terminal Device

The terminal device 100 may transmit, to the advertisement distribution server 20, a record of the operation of the terminal device 100 for the web page, in which the advertising content according to the embodiment is arranged, by the user. Specifically, the terminal device 100 records, for example, the scroll operation of the user for the web page in which advertising content is arranged, a web page enlargement/reduction operation, and the physical state of the terminal device 100, such as whether the physical sensor 140 measures the inclination of the terminal device 100 or the inclination angle of the terminal device 100 measured by the physical sensor 140.

In addition, the terminal device 100 may record various operations of the user for the terminal device 100, such as a click operation for advertising content, the number of times a web page is reloaded, and an operation of transmitting information for specifying advertising content from the terminal device (for example, an operation of writing data to an SNS). Then, the terminal device 100 transmits information about an operation history to the advertisement distribution server 20.

In this case, the advertisement distribution server 20 collects the information about the operation history transmitted from the terminal device 100 and further acquires the analysis information of the collected information. For example, the advertisement distribution server 20 acquires the number of scroll operations, the number of times the user inclines the terminal device 100, the inclination angle of the terminal device 100, and information indicating the result of the comparison between the indexes of the advertising effect, such as CTRs, from advertising content involving the control information according to the embodiment and advertising content without involving the control information.

An operation history for the web page in which the advertising content involving the control information according to the embodiment is displayed may be an index indicating the advertising effect. That is, in the web page in which the advertising content involving the control information according to the embodiment is displayed, not only the display of the web page, which is the destination of the advertising content, by the click operation of the user for the advertising content but also the history of the operation of the user for the web page, such as the inclination angle of the terminal device 100 (that is, the degree of change in the display mode of the web page by the user) are indexes indicating the interest of the user in the advertising content.

For example, the advertisement distribution server 20 can compare, for example, the number of times the user inclines the terminal device 100, the inclination angle of the terminal device 100, and the time required to incline the terminal device 100 to provide an index indicating the interest of the user in an advertisement when the advertising content involving the control information according to the embodiment is displayed. Therefore, the advertisement distribution server 20 can transmit information about the operation history of the terminal device 100 to the advertiser terminal 10 and use the information as a report indicating the index of the advertising effect of the web page in which the advertising content according to the embodiment is displayed. The advertisement distribution server 20 may transmit the information about the operation history of the terminal device 100 to the advertiser terminal 10 without any change.

In this way, the advertisement distribution server 20 shows the usability of the display mode of the advertising content involving the control information according to the embodiment in the terminal device 100 to the advertiser.

The advertisement distribution server 20 may charge the advertiser for the distribution of advertising content on the basis of the operation history distributed from the terminal device 100. For example, the advertisement distribution server 20 may charge the advertiser for the distribution of advertising content on the basis of, for example, the number of times advertising content is displayed, the number of selections of advertising content, and the number of changes to the landing page. In addition, the advertisement distribution server 20 may charge the advertiser for the distribution of advertising content when the number of times advertising content is selected is equal to or greater than a predetermined value or when advertising content is displayed or operated for a predetermined period of time or more. The advertisement distribution server 20 may dynamically change the amount of money charged to the advertiser, on the basis of the operation history distributed from the terminal device 100.

As such, the advertisement distribution server 20 charges the advertiser for the distribution of advertising content, on the basis of, for example, the number of times advertising content is selected, the display time of advertising content, and the operation of the user of the terminal device 100 for advertising content. That is, the advertisement distribution server 20 can charge the advertiser for the distribution of advertising content, on the basis of information which can objectively indicate whether the user has recognized advertising content, that is, an index indicating the degree of branding. As a result, the advertisement distribution server 20 can solve the problem of the advertisement distribution technique according to the related art that is less likely to appropriately indicate the degree of branding. Therefore, the advertisement distribution server 20 can appropriately present the degree of branding or can perform billing on the basis of the appropriate degree of branding.

9-11. Others

Among the processes according to the above-described embodiment, some or all of the processes which are automatically performed may be manually performed, or some or all of the processes which are manually performed may be automatically performed by a known method. In addition, information including the flow of the processes, the detailed names, various kinds of data and parameters described in the specification and the drawings can be arbitrarily changed except that it is specified. For example, various kinds of information described in each of the drawings are not limited to the illustrated information.

The functional concept of each component of each device is illustrated in the drawings and each component does not necessarily have the physical structure illustrated in the drawings. That is, the detailed form of the distribution and integration of the above-mentioned device is not limited to that illustrated in the drawings and some or all of the devices may be functionally or physically distributed or integrated in an arbitrary unit according to, for example, various types of load or usage conditions. For example, the request unit 151 and the operation control unit 152 illustrated in FIG. 6 may be integrated with each other.

The above-described embodiments can be appropriately combined with each other in a range in which the content of processing is consistently maintained.

9-12. Program

Figure 11:
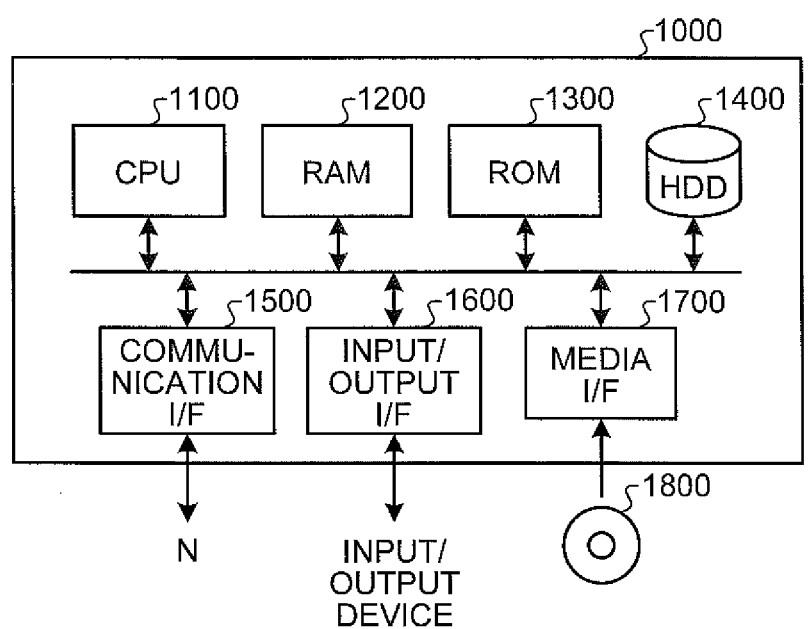
FIG. 11 is a diagram illustrating an example of the hardware configuration of a computer that implements the functions of the advertisement distribution server.

The terminal device 100, the advertisement distribution server 20, and the content distribution server 30 according to the above-described embodiments are implemented by, for example, a computer 1000 having the structure illustrated in FIG. 11. Next, description will be made using the advertisement distribution server 20 as an example. FIG. 11 is a diagram illustrating an example of the hardware configuration of a computer which implements the functions of the advertisement distribution server. The computer 1000 includes a CPU 1100, RAM 1200, ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400 and controls each unit. The ROM 1300 stores, for example, a boot program which is executed by the CPU 1100 during the start-up of the computer 1000 or a program which depends on the hardware of the computer 1000.

The HDD 1400 stores, for example, a program which is executed by the CPU 1100 and data which is used by the program. The communication interface 1500 receives data from other devices through the network N, transmits the data to the CPU 1100, and transmits data generated by the CPU 1100 to other devices.

The CPU 1100 controls an output device, such as a display or a printer, and an input device, such as a keyboard or a mouse, through the input/output interface 1600. The CPU 1100 acquires data from the input device through the input/output interface 1600. In addition, the CPU 1100 outputs the generated data to the output device through the input/output interface 1600.

The media interface 1700 reads a program, such as an information display program, or data stored in a recording medium 1800, which is an example of anon-transitory computer readable storage medium, and provides the program or the data to the CPU 1100 through the RAM 1200. The CPU 1100 loads the program from the recording medium 1800 to the RAM 1200 through the media interface 1700 and executes the loaded program. The recording medium 1800 is, for example, an optical recording medium, such as a digital versatile disc (DVD) or a phase change rewritable disk (PD), a magneto-optical recording medium, such as a magneto-optical disk (MO), a tape medium, a magnetic recording medium, or a semiconductor memory.

For example, when the computer 1000 functions as the advertisement distribution server 20 according to the embodiment, the CPU 1100 of the computer 1000 executes the program loaded to the RAM 1200 to implement the functions of the control unit 23. In addition, the HDD 1400 stores data in the storage unit 22, that is, the advertisement database 24. The CPU 1100 of the computer 1000 reads the programs from the recording medium 1800 and executes the programs. Alternatively, the CPU 1100 may acquire the programs from other devices.

When the computer 1000 functions as the terminal device 100 according to the embodiment, the CPU 1100 of the computer 1000 executes the program loaded to the RAM 1200 to implement the functions of the control unit 150.

When the computer 1000 functions as the content distribution server 30 according to the embodiment, the CPU 1100 of the computer 1000 executes the program loaded to the RAM 1200 to implement the functions of the control unit 33. In addition, the HDD 1400 stores data in the content storage unit 32.

10. Effect

As described above, the terminal device 100 displays first content (for example, the advertising content item C11a or the advertising content items C12a and C12c) on the screen. The terminal device 100 detects the physical state of the terminal device 100 using, for example, the physical sensor 140. Then, the terminal device 100 displays new second content (for example, the advertising content item C11b or the advertising content item C12b) while performing a rendering process of changing the display mode of the first content, on the basis of the detection result. As a result, when the user inputs an instruction to change the physical state of the terminal device 100, the terminal device 100 can switch the first content to the second content in various ways. Therefore, the terminal device 100 makes the user interested in arbitrary content such as advertising content.

The terminal device 100 detects the inclination of the terminal device 100 and displays the second content on the screen while changing the display mode of the first content, depending on the inclination of the terminal device 100. For example, when the inclination of the terminal device 100 is detected, the terminal device 100 displays the second content on the screen while changing the display mode of the first content. Therefore, the terminal device 100 enables the user who has become aware of the switching of advertising content to actively perform a content switching operation such as an operation of inclining the terminal device 100. As a result, the terminal device 100 makes the user interested in arbitrary content such as advertising content.

The terminal device 100 arranges the first content and the second content so as to overlap each other. Then, the terminal device 100 gradually reduces the area of the display region of the first content or gradually increases the area of the display region of the second content, on the basis of the detection result, to display the second content. Therefore, the terminal device 100 can switch content in such a way that the content to be displayed is gradually changed. As a result, it is possible to make the user interested in arbitrary content such as advertising content.

The terminal device 100 gradually reduces the width of the display region of the first content or gradually increases the width of the display region of the second content to display the second content. Therefore, the terminal device 100 can switch content in such a way that the content to be displayed is changed in a slide manner. As a result, it is possible to make the user interested in arbitrary content such as advertising content.

The terminal device 100 gradually reduces the width of each of a plurality of regions, into which the first content is divided, or gradually increases the width of each of a plurality of regions, into which the second content is divided, to display the second content. That is, the terminal device 100 performs a rendering process including a slit display process to switch content. As a result, the terminal device 100 makes the user strongly interested in arbitrary content such as advertising content.

The terminal device 100 gradually reduces the widths of a plurality of regions, into which the first content is divided, at different times or gradually increases the widths of a plurality of regions, into which the second content is divided, at different times to display the second content. That is, the terminal device 100 performs a rendering process including a time interval slit display process to switch content. As a result, the terminal device 100 makes the user strongly interested in arbitrary content such as advertising content.

The terminal device 100 changes the transmittance of the first content or changes the transmittance of the second content, on the basis of the detection result, to display the second content. Therefore, the terminal device 100 can switch content in such a way that the first content is gradually changed to the second content. As a result, it is possible to make the user interested in arbitrary content such as advertising content.

The terminal device 100 divides the first content into a plurality of small regions and changes the display mode of the first content such that aspects of change in the transmittance of each small region are different from each other or divides the second content into a plurality of small regions and changes the display mode of the second content such that aspects of change in the transmittance of each small region are different from each other. In this way, the terminal device 100 displays the second content. For example, the terminal device 100 changes the display mode of the advertising content item C11a such that the transmittances of the small regions are changed at different times, thereby displaying the advertising content item C11b, as in the rendering process illustrated in FIG. 1. Therefore, the terminal device 100 can make the user strongly interested in arbitrary content such as advertising content.

The terminal device 100 changes the display modes of a plurality of small regions, into which the first content is divided, in different modes and changes the display modes of a plurality of small regions, into which the second content is divided, in different modes. Therefore, the terminal device 100 can achieve a rendering process of making another content item, which is arranged on the back side of the first content and the second content, seen or a rendering process of changing the display of the first content and the second content in different modes. As a result, the terminal device 100 can make the user strongly interested in arbitrary content such as advertising content.

The terminal device 100 moves the first content and the second content by different distances on the basis of the detection result. For example, when the inclination of the terminal device 100 is detected, the terminal device 100 performs a parallax display process of moving the first content and the second content by different distances. Therefore, the terminal device 100 can make the user interested in arbitrary content such as advertising content.

The terminal device 100 moves the first content by a smaller distance than the second content, on the basis of the detection result, and displays the first content and the second content on the screen. For example, when the inclination of the terminal device 100 is detected, the terminal device 100 moves the advertising content items C12a and C12b by a predetermined distance and moves the advertising content item C12c by a distance that is half the predetermined distance. Therefore, the terminal device 100 can display, for example, advertising content such that a portion of the first content seems to be a portion of the second content. As a result, the terminal device 100 can make the user interested in arbitrary content such as advertising content.

When the second content is displayed on the screen, the terminal device 100 displays the first content on the screen while changing the display mode of the second content, on the basis of the detection result. As a result, the terminal device 100 can switch content many times and can make the user interested in content.

The terminal device 100 detects the inclination of the terminal device 100 and changes the display mode of the first content, depending on the inclination direction of the terminal device 100. For example, the terminal device 100 changes the transmittance of the first content, the width of the display region of the first content, and the position of the first content, depending on the inclination direction of the terminal device 100. Therefore, the terminal device 100 can make the user interested in arbitrary content such as advertising content.

The terminal device 100 detects the inclination of the terminal device 100 and changes the display mode of the first content, depending on the inclination angle of the terminal device 100. For example, the terminal device 100 performs a different rendering process on the basis of the detected inclination angles and switches the content to be displayed. Therefore, the terminal device 100 can give the user a motivation to switch content through trial and error. As a result, the terminal device 100 can make the user interested in content.

When the user selects a position on the screen while the display mode of the first content or the second content is being changed, the terminal device 100 displays new content corresponding to the content displayed at the selected position. For example, the terminal device 100 determines what content is displayed at the position selected by the user and displays a landing page corresponding to the determined content. Therefore, the terminal device 100 can give the user a motivation to select content at various points of time. As a result, the terminal device 100 can make the user interested in content.

When the user selects the first content, the terminal device 100 displays predetermined content. When the user selects the second content, the terminal device 100 displays content different from the predetermined content. For example, the terminal device 100 displays different landing pages in the first content and the second content. Therefore, the terminal device 100 can make the user interested in content.

The advertisement distribution server 20 distributes the first content, the second content, and the control information to the terminal device 100. The control information causes the terminal device 100 to perform a process of displaying the first content on the screen, a process of detecting the physical state of the terminal device 100, and a process of displaying the second content on the screen while changing the display mode of the first content, depending on the detection result. Therefore, the advertisement distribution server 20 can make the user interested in arbitrary content such as advertising content.

Some embodiments of the invention have been described in detail above with reference to the drawings. However, the embodiments are illustrative. Various modifications and changes of the invention can be made on the basis of the knowledge of those skilled in the art including the aspects described in the Disclosure of the Invention.

The term "unit (section or module)" can be replaced with, for example, a "means" or a "circuit". For example, the distribution unit can be replaced with a distribution means or a distribution circuit.

According to an embodiment, it is possible to improve the advertising effect of advertising content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An information display device comprising:
a sensor configured to detect an inclination of the information display device; and
a processor operatively coupled with a memory and the sensor, the processor being programmed to:

receive a web content including a display region from a first server; and receive a first content, a second content, and a changing program from a second server, the changing program causing the processor to:

arrange the first content in the display region of the web content;

display the web content with the first content; and in response to the inclination of the information display device detected by the sensor, gradually display the second content in the display region of the web content by changing a display mode of the first content such that the display of the first content gradually transitions to display the second content, by: (i) dividing the display region which displays the first content to a plurality of small regions, (ii) displaying a plurality of lines having a predetermined transmittance and a predetermined thickness on edges of the plurality of small regions, (iii) changing the display mode of the first content in the plurality of small regions one by one, starting from a small region arranged at an opposite direction to the direction of the inclination of the information display device, and (iv) changing the transmittance and thickness of the lines corresponding to the changed display mode of the first content.

2. The information display device according to claim 1, wherein the changing program causes the processor to:

detect the inclination of the information display device; and display the second content in the display region and change the display mode of the first based on the inclination of the information display device.

3. The information display device according to claim 2, wherein, when the inclination of the information display device is detected, the changing program causes the processor to display the second content in the display region and change the display mode of the first content.

4. The information display device according to claim 1, wherein changing program causes the processor to:

arrange the first content and the second content so as to overlap each other; and gradually reduce an area of a display region of the first content, or gradually increase an area of a display region of the second based on the detected inclination of the information display device to display the second content.

5. The information display device according to claim 4, wherein the changing program causes the processor to gradually reduce a width of the display region of the first content, or gradually increase a width of the display region of the second content to display the second content.

6. The information display device according to claim 4, wherein the changing program causes the processor to gradually reduce a width of each of a plurality of regions into which the first content is divided, or gradually increase a width of each of a plurality of regions into which the second content is divided to display the second content.

7. The information display device according to claim 1, wherein:

the sensor detects the inclination of the information display device; and the changing program causes the processor to display the second content in the display region of the web content by: (i) dividing the display region that displays the first content into a plurality of small regions, and (ii) changing a display mode of the first content in the plurality of small regions one by one, starting from a small region arranged at the opposite direction to the direction of the inclination of the information display device.

8. The information display device according to claim 1, wherein the changing program causes the processor to:

arrange the first content and the second content so as to overlap each other; and change a transmittance of the first content or a transmittance of the second content based on the inclination of the information display device to display the second content.

9. The information display device according to claim 8, wherein the changing program causes the processor to: (i) change the display mode of the first content such that aspects of change in the transmittance of each of a plurality of regions, into which the first content is divided, are different from each other, or (ii) change the display mode of the second content such that aspects of change in the transmittance of each of a plurality of regions, into which the second content is divided, are different from each other, thereby displaying the second content.

10. The information display device according to claim 1, wherein the changing program causes the processor to:

arrange the first content and the second content so as to overlap each other; and change the display modes of a plurality of regions, into which the first content is divided, into different modes, and change the display modes of a plurality of regions, into which the second content is divided, into different modes to display the second content.

11. The information display device according to claim 1, wherein the changing program causes the processor to:

arrange the first content and the second content so as to overlap each other; and move the first content and the second content by different distances based on the inclination of the information display device.

12. The information display device according to claim 11, wherein the changing program causes the processor to move the first content by a smaller distance than the second content, and display the first content and the second content in the display region.

13. The information display device according to claim 1, wherein, when the second content is displayed in the display region, the changing program causes the processor to display the first content in the display region and change the display mode of the second based on the inclination of the information display device.

14. The information display device according to claim 1, wherein the changing program causes the processor to:

detect the inclination of the information display device; and change the display mode of the first content, depending on the inclination direction of the information display device.

15. The information display device according to claim 1, wherein the changing program causes the processor to:

detect an inclination angle of the information display device; and change the display mode of the first content, depending on the inclination angle.

16. The information display device according to claim 1, wherein, when a user selects a position on the display region while the changing program causes the processor to change the display mode of the first content or the second content, the changing program causes the processor to display new content corresponding to content displayed at the selected position.

17. The information display device according to claim 1, wherein the changing program causes the processor to display predetermined content when a user selects the first content, and display content different from the predetermined content when the user selects the second content.

18. A distribution device comprising:
a distribution processor programmed to distribute a control information, a first content, and a second content to an information display device, the control information causing a processor of the information display device to perform:
arranging the first content in a display region of a web content;
displaying the web content with the first content; and
in response to detecting an inclination of the information display device, detected by a sensor, gradually displaying the second content in the display region of the web content by changing a display mode of the first content such that the display of the first content gradually transitions to display the second content, by: (i) dividing the display region which displays the first content to a plurality of small regions, (ii) displaying a plurality of lines having a predetermined transmittance and a predetermined thickness on edges of the plurality of small regions, (iii) changing the display mode of the first content in the plurality of small regions one by one, starting from a small region arranged at an opposite direction to the direction of the inclination of the information display device, and (iv) changing the transmittance and thickness of the lines corresponding to the changed display mode of the first content.

19. An information display method that is performed by an information display device, the method comprising:
receiving a web content including a display region from a first server; and
receiving a first content, a second content, and a changing program from a second server;
arranging the first content in the display region of the web content;
displaying the web content with the first content; and
in response to detecting an inclination of the information display device, detected by a sensor, gradually displaying the second content in the display region of the web content by changing a display mode of the first content such that the display of the first content gradually transitions to display the second content, by: (i) dividing the display region which displays the first content to a plurality of small regions, (ii) displaying a plurality of lines having a predetermined transmittance and a predetermined thickness on edges of the plurality of small regions, (iii) changing the display mode of the first content in the plurality of small regions one by one, starting from a small region arranged at an opposite direction to the direction of the inclination of the information display device, and (iv) changing the transmittance and thickness of the lines corresponding to the changed display mode of the first content.

20. A non-transitory computer readable storage medium having stored therein an information display program that causes a computer to perform:
receiving a web content including a display region from a first server; and
receiving a first content, a second content, and a changing program from a second server;
arranging the first content in the display region of the web content;
displaying the web content with the first content; and
in response to detecting an inclination of the information display device, detected by a sensor, gradually displaying the second content in the display region of the web content by changing a display mode of the first content such that the display of the first content gradually transitions to display the second content, by: (i) dividing the display region which displays the first content to a plurality of small regions, (ii) displaying a plurality of lines having a predetermined transmittance and a predetermined thickness on edges of the plurality of small regions, (iii) changing the display mode of the first content in the plurality of small regions one by one, starting from a small region arranged at an opposite direction to the direction of the inclination of the information display device, and (iv) changing the transmittance and thickness of the lines corresponding to the changed display mode of the first content.

* * * * *